US008312060B2

(12) United States Patent
Gilbert et al.

(10) Patent No.: US 8,312,060 B2
(45) Date of Patent: Nov. 13, 2012

(54) METHODS AND APPARATUS FOR ACCESSING PROCESS CONTROL DATA

(75) Inventors: Stephen Gilbert, Austin, TX (US); Stephen G. Hammack, Austin, TX (US); Ling Zhou, Cedar Park, TX (US); J. Michael Lucas, Leicestershire (GB); Mark J. Nixon, Round Rock, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 0 days.

(21) Appl. No.: 11/556,445

(22) Filed: Nov. 3, 2006

(65) Prior Publication Data

US 2007/0130572 A1 Jun. 7, 2007

Related U.S. Application Data

(63) Continuation of application No. PCT/US2005/015585, filed on May 4, 2005.

(60) Provisional application No. 60/567,980, filed on May 4, 2004.

(51) Int. Cl.
*G06F 7/00* (2006.01)
*G06F 17/30* (2006.01)

(52) U.S. Cl. ........................................ 707/809

(58) Field of Classification Search .................. 707/202, 707/809

See application file for complete search history.

(56) References Cited

U.S. PATENT DOCUMENTS 5,168,441 A 12/1992 Onarheim et al.
5,611,059 A 3/1997 Benton
5,631,825 A 5/1997 Van Weele et al.
5,680,409 A 10/1997 Qin et al.
5,706,455 A 1/1998 Benton et al.
5,841,654 A 11/1998 Verissimo et al.
5,926,177 A 7/1999 Hatanaka et al.
6,076,090 A * 6/2000 Burroughs et al. ........... 707/792
6,173,208 B1 1/2001 Park et al.
6,233,586 B1 * 5/2001 Chang et al. .............. 707/103 R
6,362,839 B1 3/2002 Hamilton et al.
6,366,916 B1 * 4/2002 Baer et al. ............................ 1/1

(Continued)

FOREIGN PATENT DOCUMENTS

AU 2003204842 6/2003

(Continued)

OTHER PUBLICATIONS

CAMO Software, Inc, The Unscrambler 9.6 product datasheet, www.camo.com, 2 pages.

(Continued)

*Primary Examiner* — Jacob F Bétit
*Assistant Examiner* — Griselle Corbo
(74) *Attorney, Agent, or Firm* — Hanley, Flight & Zimmerman, LLC

(57) ABSTRACT

Methods, apparatus, and articles of manufacture for accessing process control data involve loading a client object and communicating a data access request from the client object to a real object configured to communicate with a server. The real object then communicates a query to the server based on the data access request and obtains process control data from the server in response to the query. The process control data is then mapped from a first data layout associated with a server schema to a second data layout associated with a client schema. The mapped process control data is then communicated to an application.

22 Claims, 27 Drawing Sheets

U.S. PATENT DOCUMENTS

| | | | |
|---|---|---|---|
| 6,385,496 | B1 | 5/2002 | Irwin et al. |
| 6,396,516 | B1 | 5/2002 | Beatty |
| 6,445,963 | B1 | 9/2002 | Blevins et al. |
| 6,477,527 | B2 * | 11/2002 | Carey et al. .................... 707/4 |
| 6,480,860 | B1 * | 11/2002 | Monday .................... 707/102 |
| 6,571,133 | B1 | 5/2003 | Mandl et al. |
| 6,587,108 | B1 | 7/2003 | Guerlain et al. |
| 6,618,630 | B1 | 9/2003 | Jundt et al. |
| 6,633,782 | B1 | 10/2003 | Schleiss et al. |
| 6,691,280 | B1 | 2/2004 | Dove et al. |
| 6,957,110 | B2 | 10/2005 | Wewalaarachchi et al. |
| 6,973,508 | B2 | 12/2005 | Shepard et al. |
| 7,043,311 | B2 | 5/2006 | Nixon et al. |
| 7,093,200 | B2 * | 8/2006 | Schreiber et al. ............ 715/835 |
| 7,110,835 | B2 | 9/2006 | Blevins et al. |
| 7,240,072 | B2 * | 7/2007 | McKnight et al. .................... 1/1 |
| 7,392,255 | B1 * | 6/2008 | Sholtis et al. .................... 1/1 |
| 7,630,986 | B1 * | 12/2009 | Herz et al. .................... 1/1 |
| 7,702,636 | B1 * | 4/2010 | Sholtis et al. ............ 707/999.1 |
| 7,743,019 | B2 * | 6/2010 | Shah et al. .................... 707/610 |
| 2001/0007984 | A1 * | 7/2001 | Fattah et al. .................... 707/1 |
| 2001/0034733 | A1 | 10/2001 | Prompt et al. |
| 2001/0051949 | A1 * | 12/2001 | Carey et al. ............ 707/103 R |
| 2002/0004796 | A1 * | 1/2002 | Vange et al. .................... 707/10 |
| 2002/0019672 | A1 | 2/2002 | Paunonen |
| 2002/0022894 | A1 | 2/2002 | Eryurek et al. |
| 2002/0022895 | A1 | 2/2002 | Genise et al. |
| 2002/0055790 | A1 | 5/2002 | Havekost |
| 2002/0077711 | A1 | 6/2002 | Nixon et al. |
| 2002/0123864 | A1 * | 9/2002 | Eryurek et al. ............ 702/188 |
| 2002/0156872 | A1 * | 10/2002 | Brown .................... 709/219 |
| 2002/0184521 | A1 * | 12/2002 | Lucovsky et al. ............ 713/200 |
| 2003/0009754 | A1 * | 1/2003 | Rowley et al. ............ 717/177 |
| 2003/0014500 | A1 | 1/2003 | Schleiss et al. |
| 2003/0028269 | A1 | 2/2003 | Spriggs et al. |
| 2003/0033379 | A1 * | 2/2003 | Civanlar et al. ............ 709/218 |
| 2003/0041076 | A1 * | 2/2003 | Lucovsky et al. ............ 707/500 |
| 2003/0069887 | A1 * | 4/2003 | Lucovsky et al. ............ 707/10 |
| 2003/0084201 | A1 * | 5/2003 | Edwards et al. ............ 709/328 |
| 2003/0107591 | A1 * | 6/2003 | Jameson .................... 345/744 |
| 2003/0126136 | A1 * | 7/2003 | Omoigui .................... 707/10 |
| 2003/0131073 | A1 * | 7/2003 | Lucovsky et al. ............ 709/219 |
| 2003/0191803 | A1 | 10/2003 | Chinnici et al. |
| 2003/0236576 | A1 | 12/2003 | Resnick et al. |
| 2004/0075689 | A1 | 4/2004 | Schleiss et al. |
| 2004/0088688 | A1 * | 5/2004 | Hejlsberg et al. ............ 717/143 |
| 2004/0133487 | A1 * | 7/2004 | Hanagan et al. ............ 705/34 |
| 2005/0091576 | A1 * | 4/2005 | Relyea et al. ............ 715/502 |
| 2005/0182758 | A1 * | 8/2005 | Seitz et al. .................... 707/3 |
| 2005/0197803 | A1 | 9/2005 | Eryurek et al. |
| 2005/0197805 | A1 | 9/2005 | Eryurek et al. |
| 2005/0197806 | A1 * | 9/2005 | Eryurek et al. ............ 702/188 |
| 2007/0255717 | A1 * | 11/2007 | Baikov et al. .................... 707/10 |

FOREIGN PATENT DOCUMENTS

| | | | |
|---|---|---|---|
| EP | 0 813 129 | A2 | 12/1997 |
| EP | 1 122 652 | A | 8/2001 |
| EP | 1122652 | | 8/2001 |
| GB | 2 349 958 | A | 11/2000 |
| GB | 2349958 | | 11/2000 |
| GB | 2379749 | | 3/2003 |
| JP | 2003217995 | | 7/2003 |
| WO | 95/04314 | A1 | 2/1995 |
| WO | 9504314 | | 2/1995 |
| WO | 02054184 | | 7/2002 |
| WO | 02/071169 | A | 9/2002 |
| WO | 02071169 | | 9/2002 |
| WO | 03060751 | | 7/2003 |
| WO | 03/075206 | A | 9/2003 |
| WO | 03075206 | | 9/2003 |
| WO | 2005/107409 | A2 | 11/2005 |
| WO | 2005/107410 | A1 | 11/2005 |
| WO | 2005/107416 | A1 | 11/2005 |
| WO | 2005/109122 | A1 | 11/2005 |
| WO | 2005/109123 | A1 | 11/2005 |
| WO | 2005/109124 | A1 | 11/2005 |
| WO | 2005/109125 | A1 | 11/2005 |
| WO | 2005/109126 | A1 | 11/2005 |
| WO | 2005/109127 | A1 | 11/2005 |
| WO | 2005/109128 | A1 | 11/2005 |
| WO | 2005/109129 | A1 | 11/2005 |
| WO | 2005/109130 | A1 | 11/2005 |
| WO | 2005/109131 | A1 | 11/2005 |
| WO | 2005/109250 | A2 | 11/2005 |

OTHER PUBLICATIONS

STATSOFT, Statistica: Multivariate Statistical Process Control product datasheet, www.statsoft.com, 2 pages.

UMETRICS Inc., Product Specification for SIMCA-P 11, www.umetrics.com, 2 pages.

Mehta, Ashish, Ganesamoorthi, Sai, and Wojsznis, Willy, Feedforward Neural Networks for Process Identification and Prediction, Neural Network and Expert Systems Presentation, 2001, 9 pages.

Tzovla, Vasiliki and Zhang, Yan, Abnormal Condition Management using Expert Systems, Neural Network and Expert Systems Presentation, 2001, 9 pages.

UK Intellectual Property Office, Examination Report under Section 18(3) for Application No. GB0621082.7, Jan. 17, 2008, 4 pages.

Patent Cooperation Treaty, International Preliminary Report on Patentability for PCT/US2005/015585, Nov. 16, 2006, 10 pages.

Patent Cooperation Treaty, International Preliminary Report on Patentability for PCT/US2005/015596, Nov. 16, 2006, 8 pages.

UK Intellectual Property Office, Examination Report under Section 18(3) for Application No. GB0621082.7, May 4, 2007, 6 pages.

United Kingdom Intellectual Property Office, Examination Report under Section 18(3), issued on Jan. 17, 2008, in connection with corresponding United Kingdom Patent Application No. GB0621082.7 (4 pages).

The International Bureau, "International Preliminary Report on Patentability," issued by the International Bureau on Nov. 7, 2006, in connection with a counterpart international application No. PCT/US2005/015596 (7 pages).

State Intellectual Property Office of P.R. China, a first Office action issued on May 23, 2008, in connection with corresponding Chinese Patent Application No. 200580014498.6, with its English language translation (25 pages).

Fisher-Rosemount Systems, Inc., DeltaV Bulk Edit, pp. 1-12, Apr. 2002.

Kopp, John, About.com, C++ Tutorial—Lesson 29: Inheritance, Continued, http://www.cplus.about.com/od/beginnerctutorial/l/aa12050c.htm, downloaded Apr. 27, 2005.

Kopp, John, About.com, C++ Tutorial—Lesson 29: Inheritance, http://cplus.aboutcom/od/beginnerctutorial/l/aa120502b.htm, downloaded Apr. 27, 2005.

Kopp, John, About.com, C++ Tutorial—Lesson 29: Inheritance Introduction, http://cplus.about.com/od/beginnerctutorial/l/aa120502a.htm, downloaded Apr. 27, 2005.

Kopp, John, About.com, C++ Tutorial—Lesson 17: Classes, Members and Methods, Defining Methods, http://cplus.about.com/od/beginnerctutorial/l/aa070602c.htm, downloaded Apr. 27, 2005.

Kopp, John, About.com, C++ Tutorial—Lesson 17: Classes, Members and Methods, Defining Classes, http://cplus.about.com/od/beginnerctutorial/l/aa070602b.htm, downloaded Apr. 27, 2005.

Kopp, John, About.com, C++ Tutorial—Lesson 17: Classes, Members and Methods, http://cplus.about.com/od/beginnerctutorial/l/aa070602a.htm, downloaded Apr. 27, 2005.

Kopp, John, About.com, C++ Tutorial—Lesson 9: Introduction to Classes, Object Terminology, http://cplus.about.com/od/beginnerctutorial/l/aa041002e.htm, downloaded Apr. 27, 2005.

Kopp, John, About.com, C++ Tutorial—Lesson 9: Introduction to Classes, Using Objects, http://cplus.about.com/od/beginnerctutorial/l/aa041002d.htm, downloaded Apr. 27, 2005.

Kopp, John, About.com, C++ Tutorial—Lesson 9: Introduction to Classes, Defining Classes, htpp://cplus.about.com/od/beginnerctutorial/l/aa041002b.htm, downloaded Apr. 27, 2005.

Patent Cooperation Treaty, International Search Report and Written Opinion of the International Searching Authority for PCT/US2005/015596, Apr. 5, 2006, 12 pages.

Sangyong Han et al., Web Based rSPC (realtime Statistical Process Control) System Supporting XML Protocol, Industrial Electronics, Jun. 2001, pp. 399-403, Piscataway, New Jersey.
Patent Cooperation Treaty, International Search Report and Written Opinion of the International Searching Authority for PCT/US2005/015439, Aug. 10, 2005, 12 pages.
Patent Cooperation Treaty, International Search Report and Written Opinion of the International Searching Authority for PCT/US2005/015394, Mar. 20, 2006, 15 pages.
D. Chen, Real-Time Management in the Distributed Environment, Ph.D. Thesis, 1999.
Patent Cooperation Treaty, International Search Report and Written Opinion of the International Searching Authority for PCT/US2005/015585, May 9, 2006, 14 pages.
DEVELOPERS.SUN.COM, Core J2EE Patterns—Data Access Object, http://web.archive.org/web/20040414043406/java.sun.com/blueprints/corej2eepatterns/Patterns/DataAccessObject.html, Apr. 14, 2006, 10 pages.
Mohr S et al, BizTalk and Application Integration—Translating Between Message Specification: BizTalk Mapper, Professional BizTalk, Apr. 14, 2001, 3 pages.
W3C, XSL Transformations (XSLT), Version 1.0, W3C Recommendation, Nov. 16, 1999, 11 pages.
Nixon, Mark et al., U.S. Appl. No. 10/575,173, filed Apr. 7, 2006 for "Graphic Display Configuration Framework for United Process Control System Interface."
State Intellectual Property Office of P.R. China, "The Notification of the Second Office Action," issued in connection with Chinese application No. 200580014527.9, issued Dec. 19, 2008, 2 pages.
"DeQi's English Translation of the Second Office Action Text," in connection with Chinese application No. 200580014527.9, 4 pages.
Official Action dated May 23, 2008, in Chinese Application No. 200580014498.6 (25 pages).
Sangyong Han and Kyoungie Oh, "Web Based rSPC (realtime Statistical Process Control) System Supporting XML," Computer Engineering Department Chung-Ang University, IEEE, 2001 (pp. 399-403).
Notice of Reasons for Rejection, issued by the Japanese Patent Office, in connection with Japanese application No. 2007-511583, on Feb. 3, 2011, 5 pages.
Han et al., "Web Based rSPC (realtime Statistical Process Control) System Supporting XML Protocol," Computer Engineering Department, Korea, 2001, 5 pages.
Europe Search Report, issued by the European Patent Office in connection with European Application No. 10012847.9-2201, on Jan. 27, 2011, 8 pages.
Europe Office Action, issued by the European Patent Office in connection with European Application No. 05746779.7-2201, on Jan. 25, 2011, 10 pages.
Europe Search Report, issued by the European Patent Office in connection with European Application No. 10012848.7-2201, on Jan. 27, 2011, 7 pages.
OPC Council Japan, "An Introduction to OPC Applications", First Edition, Jun. 28, 2001, Nikkan Kogyo Shimbun Ltd., p. 1-3 and 8-13, ISBN: 4-526-04771-6, (17 pages).
Japanese Patent Office, "Notice of Reasons for Rejection in connection with Patent Application No. 2007-511578," Jul. 26, 2011, (8 pages).
Translation of "Notice of Reasons for Rejection", issued in connection with Japanese Patent Application No. 2007-511578, Mailed on May 15, 2012, (8 pages).

* cited by examiner

502

308

310

```
//PRE-GENERATED PARTIAL CLASS
NAMESPACE DELTAV.CONFIG.EXPLORER.HIERARCHY
{
 PUBLIC PARTIAL CLASS MODULE
  {
   //PRE-GENERATED ELEMENTS
   …
  }
}
```

504

312

506

508

```
// USER-GENERATED PARTIAL CLASS
NAMESPACE DELTAV.CONFIG.EXPLORER
{
 PUBLIC CLASS EXPLORER_MODULE
 {
  OBJECT _MODULE;

 PUBLIC STRING NAME{
   GET {//use reflection on _MODULE to get the name property}
   SET {//use reflection on _MODULE to set the name property}
 }
…
}}
```

```
<Type name='ControlModule'> 1002
        <Property name='detailDisplayName' dataType='String'/> 1004
        <Role name='Blocks' destType='BlockBase'> 1006
                <Type name='ModuleUsage' canCreate='True'> 1008
                        <CreationParameters>
                1010 <Parameter name='name' dataType='String' />
                1012 <Parameter name='Module' dataType='ModuleBase' />
                        </CreationParameters>
                </Type>
                . . .
        </Role>
        <Command name="renameTo" returnType="Void"> 1014
                <Parameter name="newName" dataType="String" /> 1016
        </Command>
</Type>

   <Enum name='DbeAttributeType'> 1018
        <Entry name='Float'/> 1020
        <Entry name='FloatWithStatus'/> 1022
   </Enum>
   <Type name='Attribute'> 1024
        <Property name='attributeType' dataType=' DbeAttributeType'/> 1026
   </Type>
```

```
<Results>
    <ModelRole name="PlantAreas"> 1102
        <PlantArea name="AREA_A"> 1104
            <Properties index="0" /> 1106
            <ModelRole name="Modules"> 1108
                <ModuleInstanceBase name="EM1"> 1110
                    <Properties name="EM1" /> 1112
                </ModuleInstanceBase>
                <ModuleInstanceBase name="LIC-549"> 1114
                    <Properties name="LIC-549" /> 1116
                </ModuleInstanceBase>
                <ModuleInstanceBase name="PLM1"> 1118
                    <Properties name="PLM1" /> 1120
                </ModuleInstanceBase>
            </ModelRole>
        </PlantArea>
    </ModelRole>
</Results>
```

FIG. 11

```
<Type name='Module' mapping='Module'>  ← 1202
</Type>

<Properties> ← 1204
    <Property name='desc' domain='database' mapping='(description)'/> ← 1206
    <Property name='rtValue' domain='runtime' mapping='(ST)'/> ← 1208
</Properties>

<Roles> ← 1210
    <Role name='attributes' domain='database' mapping='Attributes' ← 1212
destType='Attribute'/>
</Roles>
```

1500

```
<Type name='Area' mapping='Area'>   1502
    <Roles>                                                        1504
        <Role name='UnitModules' mapping='Units' destType='UnitModule'/>
    </Roles>
</Type>
<Type name='UnitModule' mapping='Unit'>   1506
    <Properties>                                                   1508
        <Property name='scanRate' mapping='UnitModule(scanRate)'/>
    <Properties>                                                   1510
    <Roles>
        <Role name='Modules' mapping='Modules' destType='Module'/>
    </Roles>
</Type>
```

1800

```
<Type name='Composite' mapping='Composite Function Block'>        1802
     <Roles>
          <Role name='Children'>        1804
               <Part mapping='Blocks' destType='Block'/>        1806
               <Part mapping='Attributes' destType='Attribute'/>        1808
          </Role>
     </Roles>
</Type>
<Type name='Block' mapping='BlockUsage'/>        1810
<Type name='Attribute mapping='AttributeDefinition'/>        1812
```

2100

```
<Type name=' Area' mapping=' Area'>
    <Roles>
        <Role name='ControlModules' mapping='Modules$Controlmodule'/>
        <Role name='PhaseLogicModules'mapping='Modules$PhaseLogicModule'/>
        <Role name='EquipmentModules' mapping='Modules$EquipmentModule'/>
    </Roles>
</Type>
```

2104

2106

2400

```
<Type name='Channel' mapping='Channel'>
        <Roles>
                <Role name='DST' mapping='Device.DST'/>
        </Role>
</Type>
```

2402

2700

```
<Type name='Controller' mapping='Controller'>
    <Roles>
        <Role name='AssignedModules' mapping='' destType='AssignedModules'/>
    </Roles>
</Type>
<Type name='AssignedModules' pseudoMapping='Controller'>
    <Roles>
        <Role name='Modules' mapping='AssignedModules' destType='Module'/>
    </Roles>
</Type>
<Type name='Module' mapping='Module'/>
```

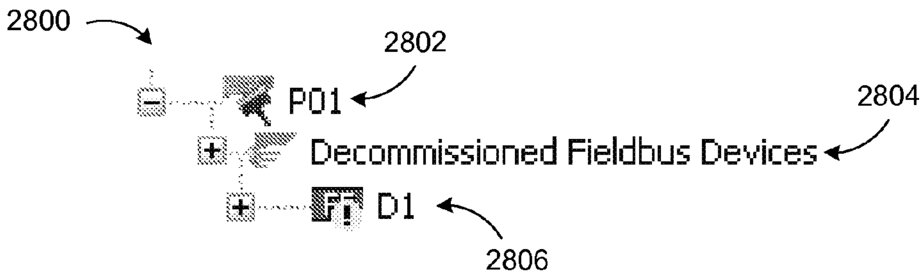

```
<Type name='FieldbusPort' mapping='Port'>
    <Roles>
        <Role name='DecommissionedDevices'
              destType='DecommissionedDevices'/>
    </Roles>
</Type>
<Type name='DecommissionedDevices'>
    <Roles>
        <Role name='Devices' assembly='commands.dll'
              command='GetDecommissionedDevices'
              destType='FieldbusDevice'/>
    </Role>
</Type>
<Type name='FieldbusDevice' mapping=''/>
```

METHODS AND APPARATUS FOR ACCESSING PROCESS CONTROL DATA

RELATED APPLICATION

This patent is a continuation of International Application Serial Number PCT/US2005/015585, entitled "Methods and Apparatus for Accessing Process Control Data" filed on May 4, 2005, which claims the benefit of provisional U.S. Patent Application No. 60/567,980, filed May 4, 2004, which is hereby incorporated by reference herein in its entirety.

FIELD OF THE DISCLOSURE

The present disclosure relates generally to processor control systems and, more particularly, to process control apparatus and methods for accessing process control data.

BACKGROUND

Process control systems, like those used in chemical, petroleum or other processes, typically include one or more centralized process controllers communicatively coupled to at least one host or operator workstation and to one or more field devices via analog, digital, or combined analog/digital buses. The field devices, which may be, for example, valves, valve positioners, switches, and transmitters (e.g., temperature, pressure and flow rate sensors), perform functions within the process such as opening or closing valves and measuring process parameters. The process controller receives signals indicative of process measurements made by the field devices and/or other information pertaining to the field devices, uses this information to implement a control routine and then generates control signals that are sent over the buses or other communication lines to the field devices to control the operation of the process. Information from the field devices and the controllers may be made available to one or more applications executed by the operator workstation to enable an operator to perform desired functions with respect to the process, such as viewing the current state of the process, modifying the operation of the process, etc.

During design phases and system operation, a system engineer must often access process control data to view, monitor, add, update, modify, etc. the process control data. For example, process control systems are typically configured using configuration applications that enable a system engineer, operator, user, etc. to define how each field device within a process control system should function for a particular process (e.g., a particular chemical production process). When a field device is added to a particular process or each time a change is made to the process, an engineer may generate a new control program or new configuration data or may update or modify an existing control program. Each process may use a large number of field devices, controllers, and/or other control devices and, thus, a control program may include a large amount of process control data. Some known process control systems provide editors or process control data viewers that enable users to monitor a process during operation and/or to view, create, and/or update control programs. Known process control data editors and viewers typically constrain a user to features that are provided by a process control software developer. For example, a process control software developer may survey its customers to determine desirable types of user interface controls and data access functionality. The user interface and data access features available to customers at the time process control software is released is then subject to the general demand by other customers to incorporate those features.

Customizing process control software on a customer-by-customer basis is often a relatively expensive and complex project. Specifically, if a customer requires specific or custom user interface or data access features, the customer needs to understand and modify the original process control software source code. In this case, a process control software vendor must provide many resources (e.g., software developers, system engineers, source code, etc.) to each customer that wishes to customize their software. In addition, the software vendor may require customers to purchase source code licenses or development licenses prior to delivering source code to the customers. Resources and/or licenses are often relatively expensive for the software vendor and/or customers. Also, by releasing certain source code, a vendor may be at risk if that source code includes trade secret, confidential, or otherwise competitively advantageous coding techniques.

SUMMARY

Example methods and systems for accessing process control system data are disclosed herein. In accordance with on example, a method for accessing process control data involves loading a client object and communicating a data access request from the client object to a real object configured to communicate with a server. The real object then communicates a query to the server based on the data access request and obtains process control data from the server in response to the query. The process control data is then mapped from a first data layout associated with a server schema to a second data layout associated with a client schema. The mapped process control data is then communicated to an application.

In accordance with another example, another method for accessing process control data involves loading first and second client objects in response to a user interface request. The first and second client objects are associated with accessing process control data organized based on a client schema. Real objects associated with the first and second client objects are then loaded. The first and second real objects are configured to obtain process control data organized based on a server schema. The process control data is then mapped from the server schema organization to the client schema organization and communicated to the first and second client objects. The process control data is then obtained by a first user interface associated with the first client object and a second user interface associated with the second client object.

In accordance with another example, a system for accessing process control data includes a pre-generated partial class and a user-generated partial class. The pre-generated partial class includes pre-generated class elements associated with accessing process control data. The user-generated partial class is associated with the pre-generated partial class and includes user-defined class elements that can access process control data via the pre-generated class elements. The system also includes a user interface that is configured to instantiate a client object based on the pre-generated partial class and the user-generated partial class. The user interface is also configured to access process control data based on the pre-generated and user-defined class elements. The system also includes a client model configured to load an object handle and a real object associated with the client object and communicate process control data between the client object and a server via the object handle and the real object.

BRIEF DESCRIPTION OF THE DRAWINGS

FIG. 5 depicts another example code configuration that may be used to share code between user-generated and pre-generated partial classes through aggregation.

FIG. 10 depicts example server schema XML source code that defines an example server schema.

FIG. 11 is example XML source code that is returned by the process control system database server to the client model in response to a query submitted by the client model.

FIG. 27 depicts example XML source code for inserting a client object into the client schema hierarchy of FIG. 26.

FIG. 28 depicts an example user interface that may be used to display items for which real-time process control data can be obtained via a command.

FIG. 30 depicts example XML source code that may be used to implement a client role as a command in the client schema hierarchy of FIG. 29.

DETAILED DESCRIPTION

Figure 1:
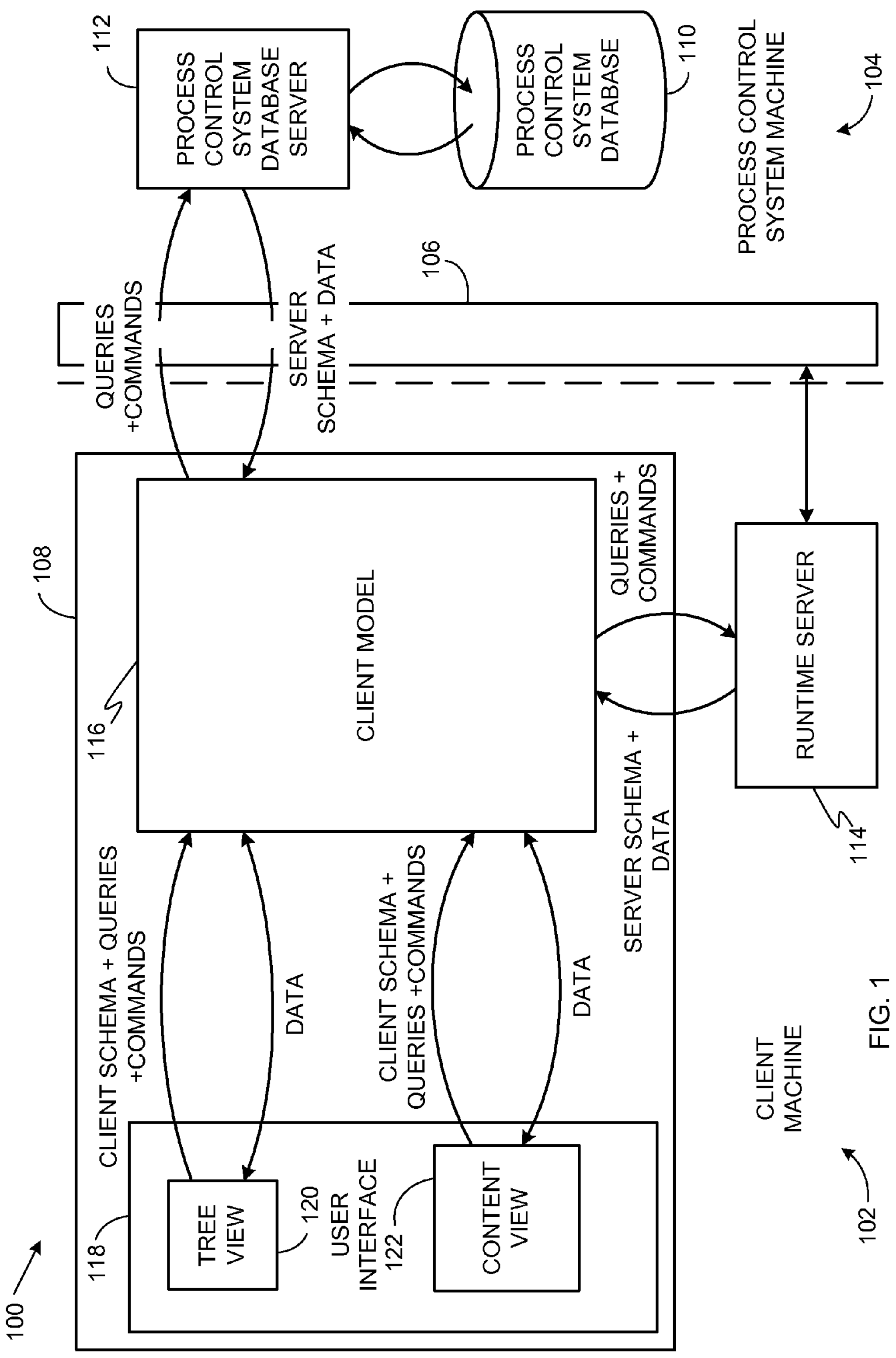
FIG. 1 is a block diagram illustrating an example client/server architecture that includes a client machine communicatively coupled to a process control system machine.

Although the following discloses example systems including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the following describes example systems, persons of ordinary skill in the art will readily appreciate that the examples provided are not the only way to implement such systems.

In contrast to known systems that constrain end users to pre-defined features and functions for accessing and interacting with process control data, the example apparatus, methods, and articles of manufacture described herein may be used to access process control data in a process control system server using customizable data access tools that enable an end user to customize the manner in which a client application accesses, represents, and displays the process control data. Process control data typically includes any data or information associated with a control system, a process, material flows and compositions, control system equipment, field devices, and any operational displays that are used to operate, maintain, and diagnose an overall system. A process control system server is typically located at a process plant and is used to store process control data. To automate, manage, and configure a process control system a company typically uses process control system software (i.e., a process control system application) that runs on a process control system server and manages every operation associated with the process control system based on user-defined process control data. A user (e.g., a system engineer) may interact with (e.g., manage, view, modify, configure, etc.) process control data using client applications that exchange commands, requests, and process control data with a process control system application. The client applications can typically be installed and run on any workstation (i.e., any computer terminal) connected to a network to which the process control system server is also connected.

Whether developed by an end-user or by a software vendor that provides process control software to an end-user, traditional client applications are often developed at the same time as or in combination with process control system applications. Traditional client applications typically provide a fixed set of data access and data handling functions to which a user is limited for accessing, representing, and viewing process control data. Customizing the data access and data handling functions is often a complex and expensive process because it requires modifying the process control system application software, modifying the client application software, re-compiling all of the software, and re-testing all of the software.

The example methods, apparatus, and articles of manufacture described herein provide a client model data interface layer (e.g., the client model 116 of FIG. 1) that provides a customizable client/server data interface through which a client application (e.g., the client application 108 of FIG. 1) can exchange data with a process control system server (e.g., the process control system database server 112). The client model 116 enables client applications to be abstracted from the process control system server 112 and portable between different process control system servers. The client model 116 includes core data access or data exchange functionality and a base set of data access and data handling functions that enable the client application 108 to communicate and interact with the process control system database server 112 and exchange process control data therewith. The client model 116 may be provided to an end user (e.g., a customer, a system engineer, etc.) in a software development kit (SDK) as a plurality of object code files, header files, source code files, etc. An end user may then develop client applications based on the client application SDK to interface with the process control system server to view, manage, and configure process control data. The end user may modify or add data access functions at any time and re-compile only the client application software each time without needing to modify the process control system application software.

As described in greater detail below, the client model 116 is implemented using partial classes associated with an object-oriented programming language. Partial classes are used to split, divide, or partition class types into two or more sections that can reside in two or more files. In this manner, a programmer may split or break up lengthy code into smaller sections or partition code based on functionality, frequency of use, or any other criteria. As described below, the partial classes can be used to separate pre-generated code from user-generated code. Corresponding partial classes may reside in any combination of object code and source code. Pre-generated code comprises pre-generated partial classes for the client model 116 that are developed during initial development of a process control system application software and compiled to generate client model object code that is delivered to an end user via, for example, a client application SDK as described above. User-generated code includes user-generated partial classes that correspond to the pre-generated partial classes and that are used to define custom functionality for a subsequently developed (e.g., an aftermarket) client application.

The end user may develop client application software by using only those functions provided in the client model object code or the end user may subsequently develop source code to define additional, user-defined data access functions to access, represent, and/or display process control data as desired by the end user. The user-defined data access functions are developed in user-generated partial classes may use any resources, elements, or functions defined in corresponding pre-generated partial classes of the client model object code. During compile time a compiler scans every file (e.g., every object file and source file) of a software project and cross links corresponding partial classes to form a complete class that defines every element, function, or aspect of that class. During execution, the client application 108 recognizes the combined corresponding partial classes as a complete class and, thus, enables user-defined data access functions to work with the client model 116 as if the user-defined data access functions were originally part of the client model object code.

The client model 116 also enables a user to define the process control data layout or how the process control data is represented when it is retrieved from a process control system database (e.g., the process control system database 110 of FIG. 1). The process control system database 110 organizes process control data using tables, columns, records, entries, fields, etc. When the process control system database server 112 retrieves process control data from a process control system database, the server organizes the process control data according to a server schema. However, client applications often require the process control data to be organized, represented, or laid out differently so that the client applications can display the process control data as defined by a user. To facilitate accessing and displaying data via a client application, an end user may define a client schema for each client application during the design phase of that client application. During operation, the client model 116 may obtain process control data from the process control system database server 110 in a server schema organization or arrangement and rearrange the process control data from the server schema organization to a client schema organization or arrangement according to the user-defined client schema as described below in connection with FIGS. 13 through 30.

Now turning in detail to FIG. 1, a client/server architecture 100 includes a client machine 102 and a process control system machine 104. The client machine 102 is generally used to view, modify, and manage any process control data associated with a process control system. The client machine 102 may be implemented using a computer, a workstation terminal, a portable computer, a laptop computer, a handheld personal digital assistant (PDA), or any other suitable processor system. The process control system machine 104 stores the process control data and automates and manages a process control system based on the process control data. The process control system machine 104 may be a workstation, a mainframe, a server, or any other suitable processor system (e.g., the example processor system 3310 of FIG. 33) that is communicatively coupled to control devices in a process control system. The process control system machine 104 is configured to provide the process control data to the client machine 102 (or any other client machine configured to communicate with the process control system machine 104) and is configured to modify, add, or update process control data as requested by the client machine 102 and/or control devices in a corresponding process control system.

The client machine 102 may be communicatively coupled to the process control system machine 104 via a communication network 106. The communication network 106 may be, for example, a local area network (LAN) or a wide area network (WAN), and may be implemented using any suitable communication technology or combination of technologies such as, for example, Ethernet, IEEE 802.11, Bluetooth®, any digital or analog mobile communication system (i.e., a cellular communication system), digital subscriber line (DSL), any broadband communication system, etc.

The client machine 102 includes the client application 108 that enables a user to retrieve, view, manage, and store process control data. A user may install machine accessible instructions in the client machine 102 that implement the client application 108 and subsequently use the client application 108 to access stored process control data and/or real-time process control data. Stored process control data may include information associated with control device configuration parameters, process control data values measured at periodic intervals, historical measurement values, or any other values that may be stored for subsequent retrieval. In general, real-time process control data includes any process control data that is not stored, but instead generated or derived upon request. For example, real-time process control data may include process control data values that are measured, acquired, generated, or calculated in response to a data request from the client application 108.

Stored process control data may be obtained from the process control system machine 104. The process control system machine 104 includes a process control system database 110 that is configured to store process control data (e.g., stored process control data) and the process control system database server 112 that is communicatively coupled to the process control system database 110. The process control system database server 112 is configured to communicate stored process control data between the process control system database 110 and the client application 108.

The client machine 102 includes a runtime server 114 to provide real-time process control data. The runtime server 114 may be communicatively coupled to the network 106 and configured to obtain process control data from the database server 112 and/or directly from control devices in a process control system. For example, the runtime server 114 may derive real-time process control data based on one or more stored process control data by requesting process control data from the database server 112 and performing, for example, a mathematical operation or any other operation on the retrieved process control data. If the client application 108 requests a real-time measured process control data value (e.g., a temperature value, a pressure value, a flow rate value, etc.) associated with a control device, the runtime server 114 may communicate with that control device via the process control system machine 104 and/or the network 106 to retrieve the real-time measured process control data value.

The client application 108 includes the client model 116 and a user interface 118. The client model 116 is communicatively coupled to the process control system machine 104 and the runtime server 110 and enables the client application 108 to communicate with the process control system machine 104 and the runtime server 110 to access stored process control data and real-time process control data. Specifically, the client model 116 provides data access functions that may be used by the client application 108 to access and exchange stored and real-time process control data. The data access functions include a base set of data access functions and may also include user-defined data access functions. As described in greater detail below in connection with FIG. 2, the base set of data access functions are provided via pre-generated partial classes and the user-defined data access functions are provided via user-generated partial classes that correspond to the pre-generated partial classes.

The user interface 118 is configured to generate a plurality of graphics-based and/or text-based user interface screens that may be used to access, view, manage, modify, update, etc. process control data. A user may specify during a design phase and/or during a runtime phase a display layout or display arrangement to be used by the user interface 118 to display the process control data. By way of example, the user interface 118 is shown as including a tree view interface 120 and a content view interface 122. The tree view interface 120 may be used to display process control data in a hierarchical tree structure with expanding and collapsing portions to view less or more detail of selected control devices. The content view interface 122 may be used to display process control data overlayed onto a process control system diagram. For example, the content view interface 122 may display a plurality of control devices communicatively coupled to one another in a process control system diagram and display process control data adjacent to or on corresponding control devices. In this manner, a user may view process control data in the context of an entire process control system.

The client model 116 communicates process control data between the user interface 118, the runtime server 114, and the process control system database server 114 based on schemas, queries, and commands. A schema defines a particular data organization, arrangement, or data layout for how process control data should be represented. For example, a client schema defines the particular data arrangement or data layout used to represent process control data for the user interface 118. The user interface 118 may be associated with a plurality of client schemas, each of which is used to arrange, organize, or represent different process control data. For example, one client schema may be used to represent pump control device data while another client schema may be used to represent property values that are common to a plurality of control devices while yet another client schema may be used to represent process control data associated with control devices in a particular plant area.

A server schema defines the particular data arrangement or data layout used to represent or arrange process control data for the process control system database server 112 and the runtime server 114. The server schema for the process control system database server 112 may be different than a server schema for the runtime server 114. However, in general, server schemas are typically used to represent, organize, or arrange data differently than client schemas. For example, server schemas may be used to represent all of the process control data associated with a process control system, while client schemas may be used to represent only specific portions or segments of that process control data.

The client model 116 is configured to convert or map process control data between server schemas and client schemas as described in detail below in connection with FIGS. 13 through 30. For example, in response to a data request query from the user interface 118, the client model 116 converts or maps the process control data from a server schema to the client schema to arrange the process control data based on the client schema provided by the user interface 118. The client model 116 may also convert or map modified or updated process control data from a client schema to a server schema in response to an update query from the user interface 118.

Queries generated by the user interface 118 and/or the client model 116 may include data request queries and update queries. The data request queries are used to retrieve particular process control data and the update queries are used to modify or update process control data in, for example, the process control system database 110. In response to receiving a query from the user interface 118, the client model 110 determines whether the query is associated with stored or real-time process control data and communicates the query to the process control system database server 112 or the runtime server 114 accordingly. If the query includes portions associated with both stored and real-time process control data, the client model 116 may parse or divide the query into a real-time data query and a stored data query and communicate the queries to the servers 112 and 114, respectively.

The commands may include machine accessible instructions that cause the servers 112 and 114 to retrieve, modify, and/or create process control data. For example, some commands may include instructions associated with accessing (e.g., retrieving, modifying, or creating) process control data in the process control system database 110 based on the queries and update queries. Additionally, some commands may include instructions that cause the runtime server 114 to measure or acquire process control data from a control device or cause the runtime server 114 to derive a process control data value (e.g., an average value, a filtered value, etc.) based on stored process control data.

Figure 2:
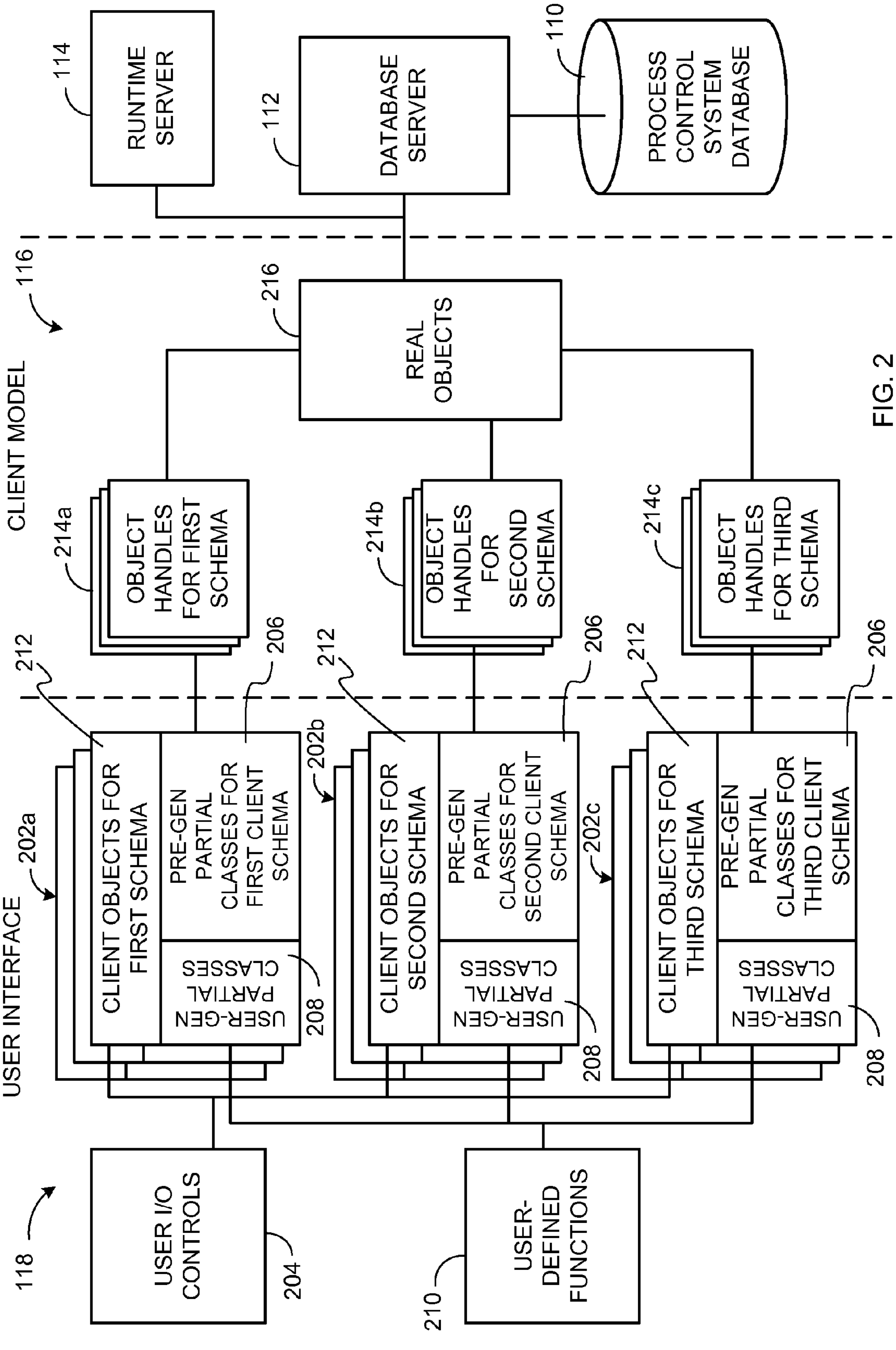
FIG. 2 is a detailed functional block diagram of the client model and the user interface of FIG. 1.

FIG. 2 is a detailed functional block diagram of the client model 116 and the user interface 118 of FIG. 1. Specifically, FIG. 2 depicts the manner in which partial classes are used during a runtime phase to exchange process control data between the user interface 118, the client model 116, and the servers 112 and 114. The user interface 118 uses a plurality of client schemas (e.g., the plurality of client schema hierarchies of FIGS. 14, 17, 20, 23, 26, and 29) to address different process control data. By way of example, the user interface 118 is shown as including a first client schema object model 202*a*, a second client schema object model 202*b*, and a third client schema object model 202*c*, each of which is associated with a respective one of a first, a second, and a third client schema. The user interface 118 also includes user I/O controls 204 that are configured to display process control data in user interface (UI) views (e.g., the tree view 120 and content view 122 of FIG. 1) and to obtain user input associated with retrieving, displaying, and/or modifying process control data. The user I/O controls 204 may include, for example, textboxes, buttons, lists, data fields, etc. and may be implemented using any suitable control framework including, for example, the Microsoft® Avalon controls framework.

Each of the client schema object models 202*a-c* includes one or more pre-generated partial classes 206 and one or more user-generated partial classes 208 that enable accessing and handling process control data associated with a respective one of first, second, and third client schemas. Specifically, the pre-generated partial classes 206 include pre-defined class elements, while the user-generated partial classes 108 include user-defined class elements. Class elements may include data members, accessors, methods or functions, implementations, and/or any other class element known in the art, each of which may be designated as private, protected, or public. The class elements of the pre-generated partial classes 206 may be used to communicate with the process control system database server 112 (FIGS. 1 and 2) via real objects (e.g., the real objects 216 described below) as described in detail below in connection with FIG. 6. The class elements of the user-generated partial classes 208 may be configured to access data associated with the class elements of corresponding ones of the pre-generated partial classes 206 and may be configured to communicate with the process control system database server 112 via the class elements in the pre-generated partial classes 206. As shown in FIG. 2, the user-generated partial classes 108 include user-defined functions 210. Each complete class formed by corresponding ones of the partial classes 206 and 208 may be associated with different types of process control data. For instance, an example class may include data access and handling functions associated with a particular type of control device while another example class may include data access and handling functions associated with a particular process plant area or a particular process control subsystem. Yet another example class may include functions associated with mathematically and/or statistically processing (e.g., averaging, filtering, etc.) process control data.

During a development phase, for each client schema, an end user may select one or more pre-generated partial classes to create each of the pre-generated partial classes 206. Also during the development phase, the end user may develop the user-defined functions 210 and create the user-generated partial classes 208 of each of the client schema object models 202*a-c* by selecting one or more user-generated partial classes associated with the user-defined functions 210.

The partial classes 206 and 208 selected for the first client schema object model 202*a* may be different from the partial classes 206 and 208 selected for the second client schema object model 202*b*. For example, the partial classes 206 and 208 for the first client schema object model 202*a* may be used to access process control data associated with control devices of a first process plant area while the partial classes 206 and 208 for the second client object model 202*b* may be used to access process control data associated with control devices of a second process plant area.

During a runtime phase, the partial classes 206 and 208 may be used to generate a plurality of client objects 212 for each of the client schema object models 202*a-c*. The client objects 212 follow or correspond to the data arrangement or the data layout of the client schemas of a client application (e.g., the client application 108 of FIG. 1). Each of the client objects 212 is of a class type defined by one of the partial classes 206 and 208. Two or more of the client objects 212 of the same class type may be generated such as, for example, two objects of class type pump, each for a different physical pump control device in a process control system. In addition, two or more of the client objects 212 may be generated to access process control data associated with the same physical control device. Accesses to the process control data of the same physical control device by the two or more of the client objects 212 are arbitrated or handled in the client model 116 via real objects (e.g., the real objects 216) as described below. The client objects 212 can be used to data-bind the user I/O controls 204 to real-time and stored process control data as described in detail below in connection with FIG. 9. By data binding the user I/O controls 204 to the process control data, the client objects 212 can generate data request queries and/or data update queries in response to user-input provided via the user I/O controls. As described above, the queries are used to retrieve or modify stored or real-time process control data. The client objects 212 can also update process control data values displayed via the user I/O controls 204 in response to data update events indicating that at least some process control data values in, for example, the process control system database 210, have changed or have been modified.

The client model 116 includes a first plurality of object handles 214*a*, a second plurality of object handles 214*b*, and a third plurality of object handles 214*c*. As shown in FIG. 2, each of the plurality of object handles 214*a-c* is associated with a respective one of the client schema object models 202*a-c*. The client model 116 also includes a plurality of real objects 216. The real objects 216 follow or correspond to the data arrangement or the data layout of server schemas associated with the process control system database server 112 and/or the runtime server 114 of FIG. 1. The object handles 214*a-c* are address references or base addresses that correspond to the locations of the real objects 216 in memory. During runtime, when one of the real objects 216 is created and stored on a memory heap, a corresponding handle in one of the handles 214*a-c* is also created and stored on a memory stack. Each of the client objects 212 is associated with one of the real objects 216 and accesses process control data via that one of the real objects 216 by communicating data access requests, queries, update queries, and/or process control data to that real object via the object handle (e.g., one of the object handles 214*a-c*) of that real object. The real objects 216 communicate queries and/or update queries to the process control system database server 112 in response to queries or update queries received from the client objects 212. The real objects 216 obtain from the process control system database server 112 process control data organized or arranged based on a server schema (e.g., one of the server schema hierarchies of FIGS. 14, 17, 20, 23, 26, and 29). The client model 116 then maps, rearranges, or converts the process control data from a server schema organization to a client schema organization as described below in connection with FIGS. 13 through 29.

In some cases, two or more of the client objects 212 correspond to a particular one of the real objects 216. For example, when two or more of the client objects 212 are constructed from the same class type to access the same process control data, a single one of the real objects 216 is created for those two or more of the client objects 212. In this manner, one of the real objects 216 can arbitrate data access requests made to the same process control data by two or more of the client objects 212.

Figure 3:
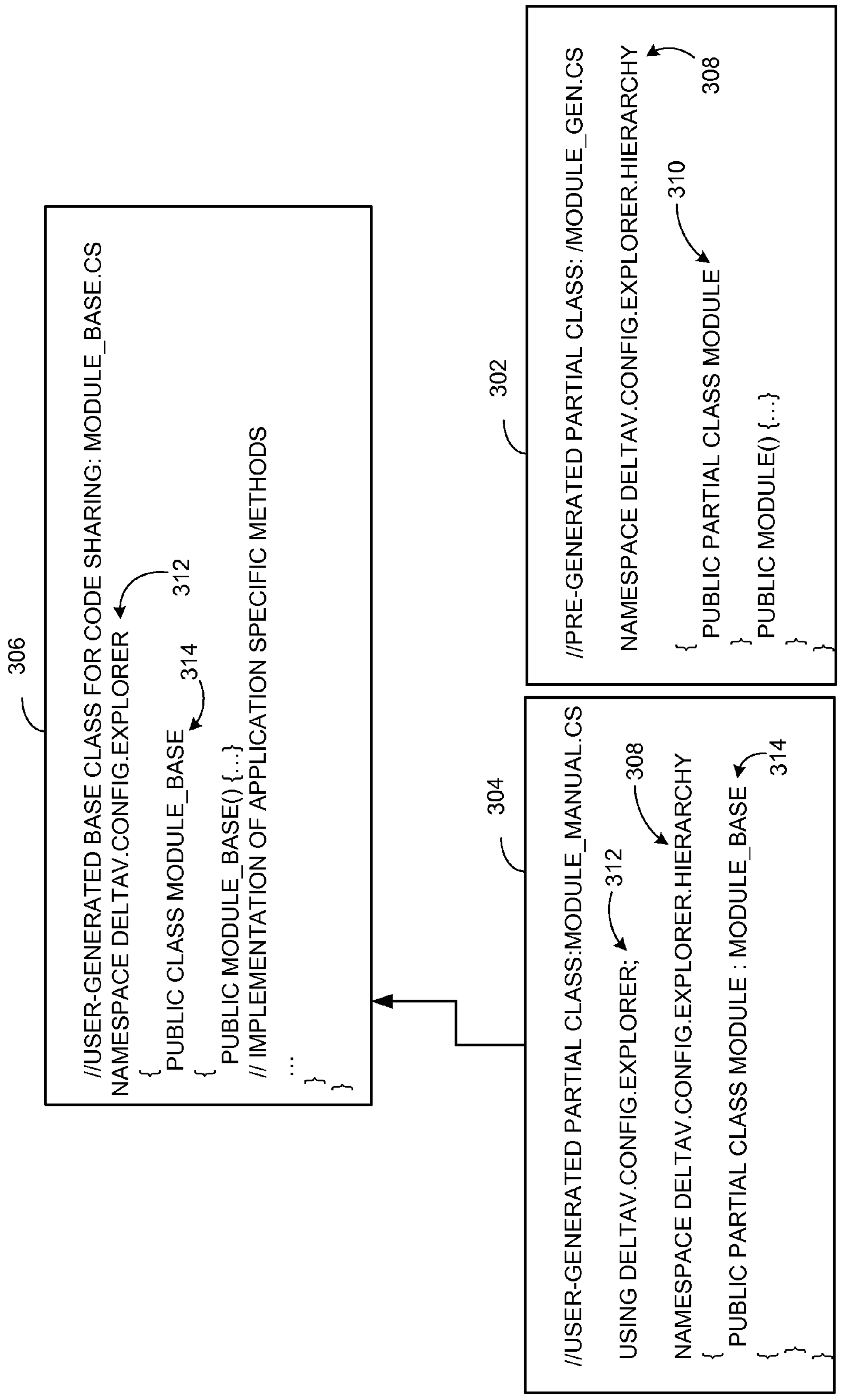
FIGS. 3 and 4 depict an example code configuration that may be used to share code between user-generated and pre-generated partial classes through inheritance.
Figure 4:
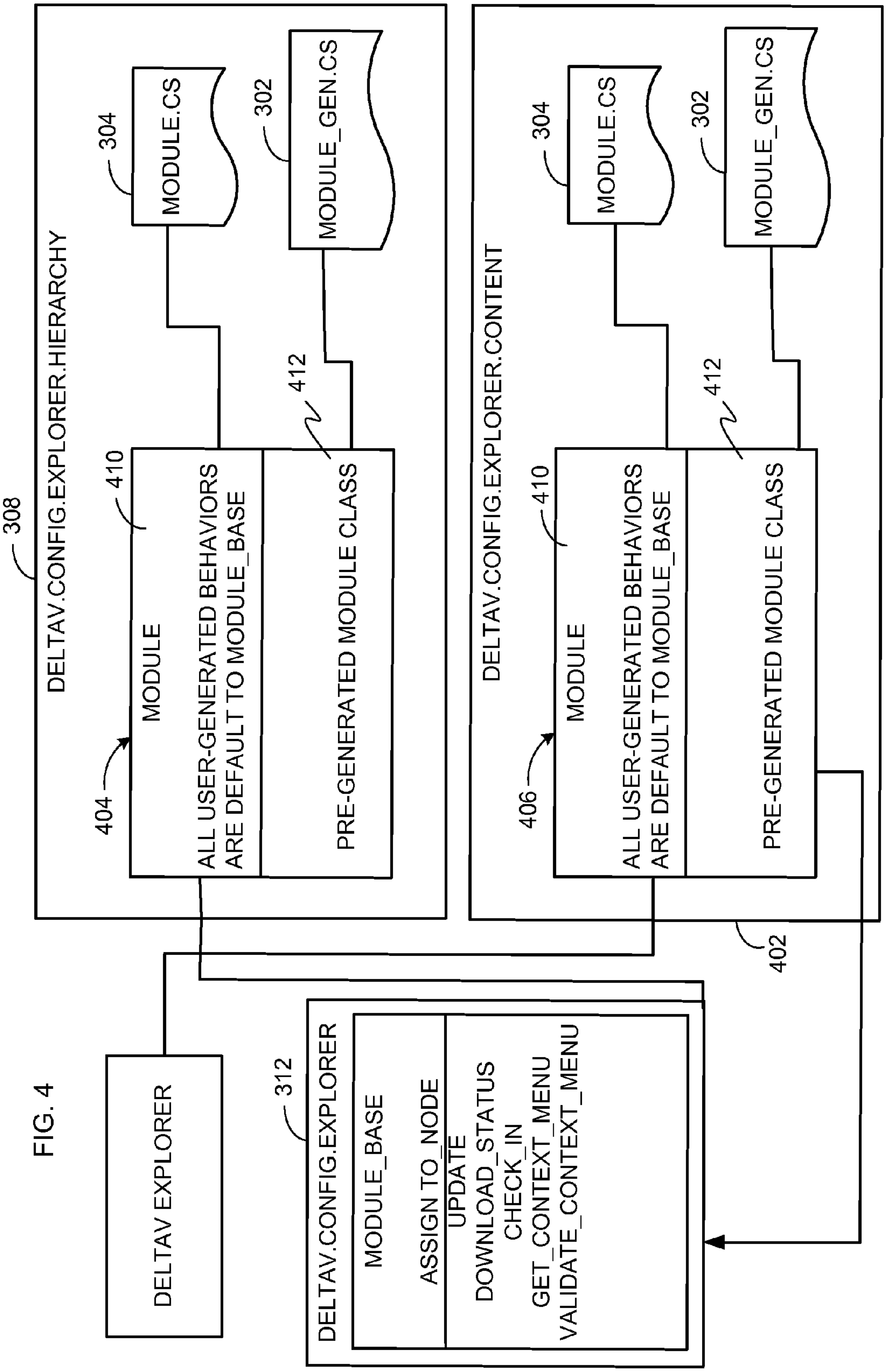

FIGS. 3 and 4 depict an example code configuration that may be used to share code between user-generated and pre-generated partial classes through inheritance. FIG. 3 shows a pre-generated file 302 named 'MODULE_GEN.CS', a first user-generated file 304 named 'MODULE_MANUAL.CS', and a second user-generated file 306 named 'MODULE_BASE.CS.' The pre-generated file 302 defines partial classes in a namespace 'DELTAV.CONFIG.EXPLORER.HIERARCHY' 308, which contains a pre-generated public partial class of type 'MODULE' 310 (i.e., the pre-generated public partial class 'MODULE' 310). The public partial class 'MODULE' 310 may include class elements configured to communicate with the process control system database server 112 of FIGS. 1 and 2. The public partial class 'MODULE' 310 may be part of the pre-generated partial classes 206 of FIG. 2.

The first user-generated file 304 uses a namespace 'DELTAV.CONFIG.EXPLORER' 312 and partial class definitions in the namespace 'DELTAV.CONFIG.EXPLORER.HIERARCHY' 310. In the namespace 'DELTAV.CONFIG.EXPLORER.HIERARCHY' 310, the pre-generated public partial class 'MODULE' 310 inherits the class elements of the user-generated class 'MODULE_BASE' 314. In this manner, the classes 'MODULE' 310 and 'MODULE_BASE' 314 can share or access each other's class elements. For example, class elements defined in the class 'MODULE_BASE' 314 can communicate with the process control system database server 112 via class elements defined in the class 'MODULE' 310. The class 'MODULE_BASE' 314 is defined in the second user-generated file 306 described below and may be part of the user-generated partial classes 208 of FIG. 2.

The second user-generated file 306 includes source code that may be used to configure a client application (e.g., the client application 108 of FIG. 1) to share source code between the pre-generated partial class 'MODULE' 310 and the user-generated partial class 'MODULE_BASE' 314. In the second user-generated file 306, the namespace 'DELTAV.CONFIG.EXPLORER' 312 contains the implementation of application-specific methods for the user-generated partial class 'MODULE_BASE' 314. The application-specific methods of the user-generated 'MODULE_BASE' 314 are inherited by the user-generated partial class 'MODULE' 310 in the first user generated file 304.

FIG. 4 depicts an example runtime configuration used to share the source code of FIG. 3 between two different namespaces during a runtime phase. FIG. 4 shows an instance of the namespace 'DELTAV.CONFIG.EXPLORER' 312, an instance of the namespace 'DELTAV.CONFIG.EXPLORER.HIERARCHY' 308, and an instance of a namespace 'DELTAV.CONFIG.EXPLORER.CONTENT' 402. Client objects of the partial class type 'MODULE' 310 loaded or instantiated in either of the namespaces 308 or 402 can use source code or class elements defined in either the pre-generated file 302 or the user-generated file 306.

The instance of the namespace 'DELTAV.CONFIG.EXPLORER' 312 includes the class elements defined in the second user-generated file 306 (FIG. 3) for the user-generated partial class 'MODULE_BASE' 314. The instance of the namespace 'DELTAV.CONFIG.EXPLORER.HIERARCHY' 308 includes a first 'MODULE' client object 404 of class type 'MODULE' (e.g., the partial class type 'MODULE' 310). The instance of the namespace 'DELTAV.CONFIG.EPLORER.CONTENT' 402 includes a second 'MODULE' client object 406, which is also of class type 'MODULE' (e.g., the partial class type 'MODULE' 310). Each of the client objects 404 and 406 includes a user-generated portion 410 (e.g., user-generated class elements) and a pre-generated portion 412 (e.g., pre-generated class elements). The user-generated portions 410 include class elements defined in the user-generated class 'MODULE_BASE' 310 of the second user-generated file 304. The pre-generated portions 412 include class elements defined in the user-generated partial type class 'MODULE' 310 of the pre-generated file 302.

FIG. 5 depicts another example code configuration that may be used to share code between user-generated and pre-generated partial classes through aggregation. Pre-generated partial class code 502 includes the namespace 'DELTAV.CONFIG.EXPLORER.HIERARCHY' 308 that contains the pre-generated partial class 'MODULE' 310. User-generated partial class code 504 includes the namespace 'DELTAV.CONFIG.EXPLORER.HIERARCHY' 312 that contains the user-generated class 'EXPLORER_MODULE' 506. To share source code or class elements between the pre-generated partial class 'MODULE' 310 and the user-generated class 'EXPLORER_MODULE' 506, the user-generated class 'EXPLORER_MODULE' 506 defines a client object of type 'MODULE' 508 (e.g., the partial class type 'MODULE' 310) that may be used by all of the class elements of the pre-generated partial class 'MODULE' 310 defined in the pre-generated partial class code 502.

Figure 6:
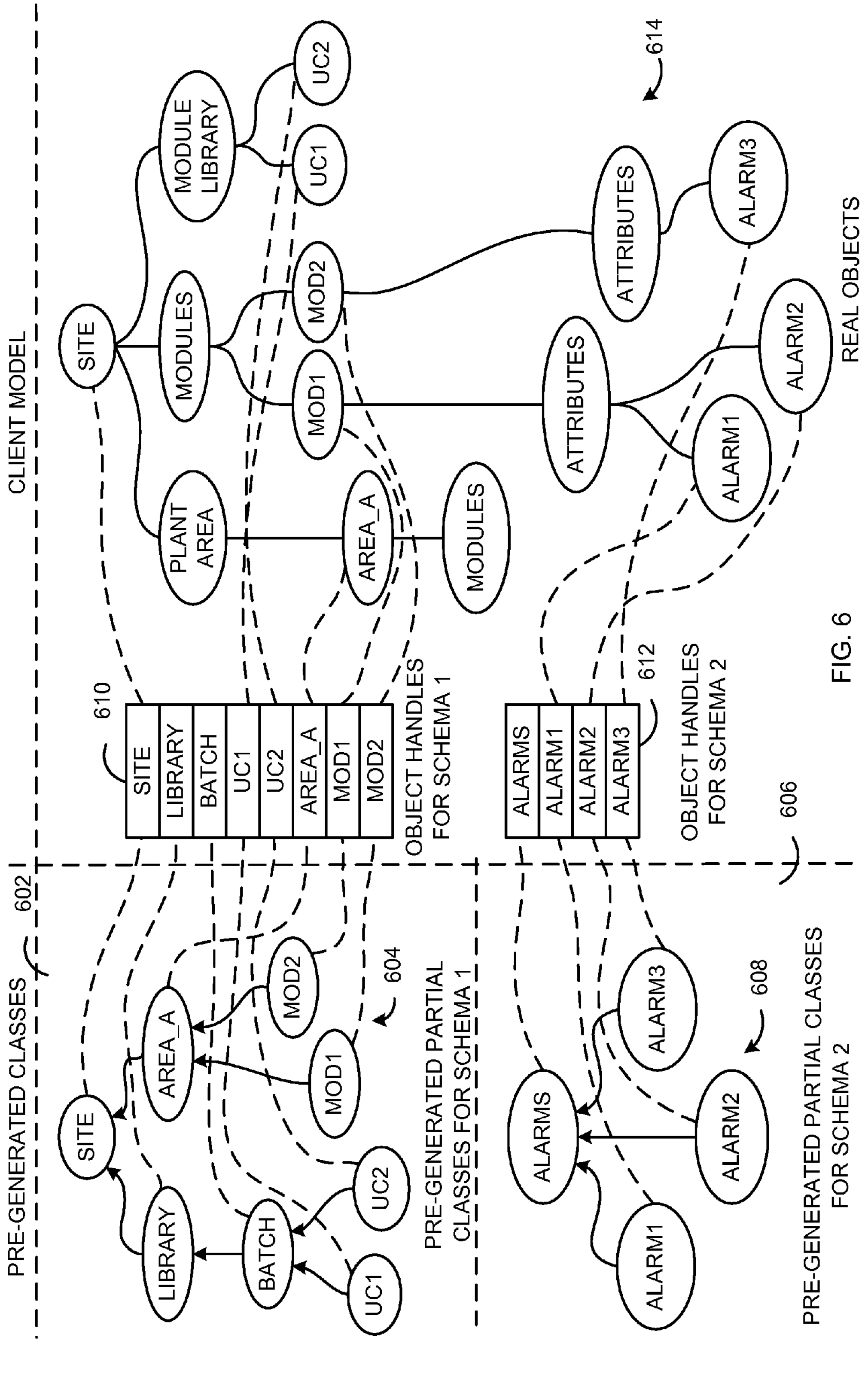
FIG. 6 depicts the relationships between pre-generated partial classes and real objects of a client application having two client schemas.

FIG. 6 depicts the relationships between pre-generated partial classes and real objects of a client application (e.g., the client application 108 of FIG. 1) having two client schemas. A first client schema 602 uses a first plurality of pre-generated partial classes 604 and a second client schema 606 uses a second plurality of pre-generated partial classes 608. The pre-generated partial classes 604 and 608 are substantially similar or identical to the pre-generated partial classes 206 of FIG. 2. The client application 108 uses the two client schemas 602 and 606 to address different needs or different process control data. For example, the first client schema 602 is associated with modules under particular plant areas and the second client schema 606 is associated with alarms for a particular subsystem.

The client model 116 includes a first plurality of object handles 610 associated with the first client schema 602 and a second plurality of object handles 612 associated with the second client schema 606. The object handles 610 and 612 are substantially similar or identical to the object handles 214*a-c* of FIG. 2. The client model 116 builds or generates a separate group or tree of object handles for each of the client schemas 602 and 606. The hierarchical relationship of the pre-generated partial classes in each of the pre-generated partial classes 604 and 608 is identical to the hierarchical relationships of the corresponding object handles 610 and 612.

The client model 116 also includes a plurality of real objects 614 that are substantially similar or identical to the real objects 216 of FIG. 2. The client application 108 communicates with the real objects 614 via client objects (e.g., the client objects 212 of FIG. 2 and 710*a-d* of FIG. 7) associated with the pre-generated partial classes 604 and 608. Specifically, client objects associated with the partial classes 604 and 608 access the real objects 614 via the object handles 610 and 612.

When the client application 108 communicates a data access request (e.g., a query) from the first client schema 602 to the client model 116, the client model 116 loads real objects (e.g., some of the real objects 614) associated with the particular process control data (e.g., a particular plant area) with which the data access request is associated. When the client application 108 communicates a data access request (e.g., a query) from the second client schema 606, the client model 116 loads all alarm attributes or properties of the ones of the real objects 614 associated with alarms for the particular subsystem with which the data access request is associated as shown in FIG. 6.

The client application 108 controls the life time of the real objects 614 or the duration for which the real objects 614 are loaded. For example, if the client application 118 indicates that some of the real objects 614 should remain loaded, those objects will not be available for unloading. Typically, objects such as the real objects 614 are unloaded by a garbage collection routine that periodically detects real objects that a client application has designated as available for garbage collection or available for unloading. For example, if the client application 118 determines that some of the real objects 614 should be unloaded, those objects are designated as available for garbage collection. In this case, a subsequent garbage collection scan will result in unloading the ones of the real objects 614 flagged as available for garbage collection or not flagged as currently in use.

Figure 7:
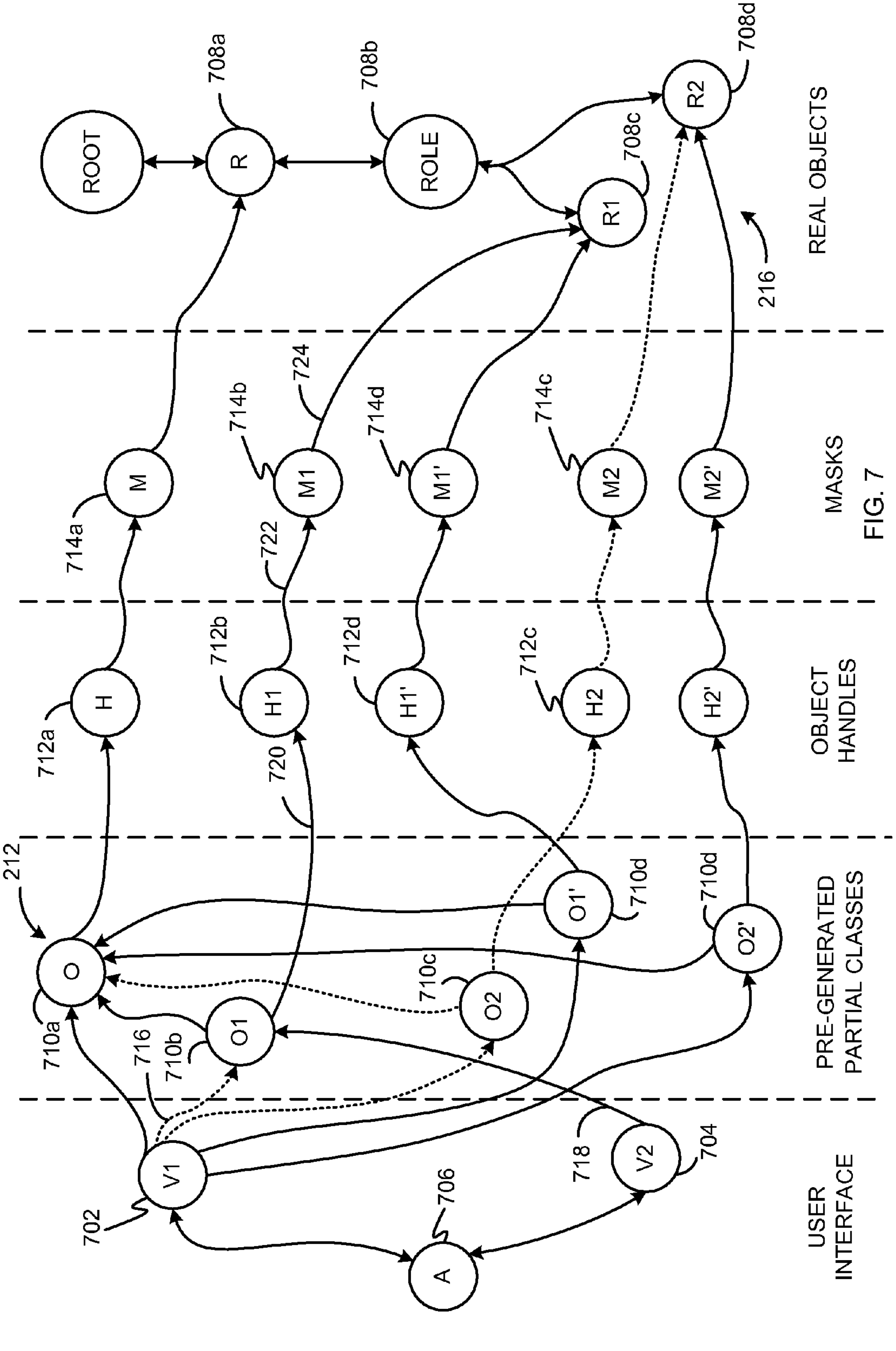
FIGS. 7 and 8 depict data paths formed between the user interface and the client model of FIGS. 1 and 2 during a runtime phase.
Figure 8:
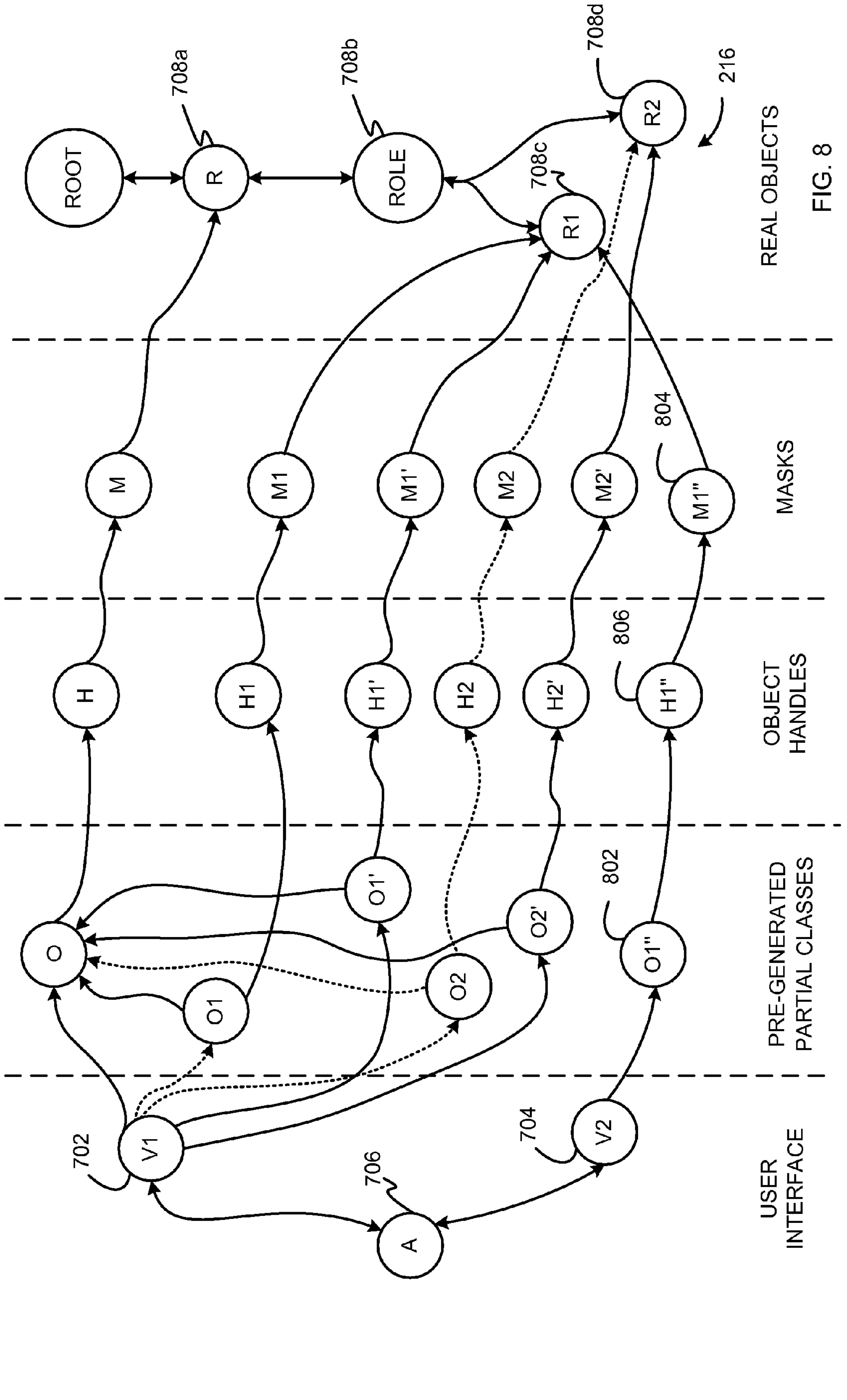

FIGS. 7 and 8 depict data paths formed between the user interface 108 and the client model 116 of FIGS. 1 and 2 during a runtime phase. In particular, FIG. 7 depicts data paths between the client objects 212 and the real objects 216 for a first user interface (UI) view 702 and a second UI view 704 In FIG. 7, the UI views 702 and 704 share a common client schema. FIG. 8 depicts data paths between the client objects 212 and the real objects 216 where the first UI view 702 and the second UI view 704 each has its own client schema. The UI views 702 and 704 may be substantially similar or identical to the tree view 120 and/or the content view 122 of FIG. 1.

As shown in FIGS. 7 and 8, the first and second UI views 702 and 704 belong to or are associated with a client application object 706. Each of the UI views 702 and 704 accesses process control data via one or more of the real objects 216. The real objects 216 are shown as having a parent real object 'R' 708*a* that loads a 'ModuleLibrary' real role 708*b*. A role such as, for example, the 'ModuleLibrary' real role 708*b*, exposes or provides access to a plurality of process control data associated with that role. For example, a role may provide access to process control data associated with a particular plant area or with a particular type of control device. The 'ModuleLibrary' real role 708*b* loads a first real object 'R1' 708*c* and a second real object 'R2' 708*d* in response to process control data requests from the UI views 702 and 704. For example, the first real object 708*c* may be associated with a first control device while the second real object 708*d* may be associated with a second control device.

To access process control data via the real objects 216, the UI views 702 and 704 load the client objects 212 to communicate with the real objects 216. For example, as shown in FIG. 7, to access process control data associated with the 'ModuleLibrary' real role 708*b*, the first UI view 702 loads a parent client object 'O' 710*a*. The parent client object 'O' 710*a* references a parent object handle 'H' 712*a* that the parent client object 710*a* uses to access the parent real object 'R' 708*a* via a zeroth mask 'M' 714*a*. A mask such as, for example, the zeroth mask 'M' 714*a*, is configured to translate or map process control data from a data layout or arrangement of a server schema to data layout or arrangement of a client schema. For instance, the parent real object 708*a* may be a library object that provides access to a plurality of process control data libraries. If the parent client object 710*a* is configured to access only a subset of the plurality of library objects (e.g., the 'ModuleLibrary' real role 708*b*) associated with the parent real object 708*a*, the mask 714*a* translates or maps library access requests from the parent client object 710*a* to the corresponding libraries in the parent real object 708*a*. For example, a mask may include a plurality of pointers arranged in a layout that corresponds to a client schema and that point to or reference process control data in a real object.

The data paths are shown as a plurality of active and inactive data paths. A solid line represents a data path that is active or in use by one of the UI views 702 and 704 to access a particular object, handle, or mask. A dotted line represents a data path that is inactive or no longer in use by either of the UI views 702 or 704. For example, initially the first UI view 702 causes the parent client object 'O' 710*a* to instantiate or load a first child client object 'O1' 710*b*. The first UI view 702 can use the first child client object 710*b* to access process control data via the first real object 708*c*. The first UI view 702 accesses the first child client object 710*b* via a first data path 716, which is initially a solid line (not shown) to indicate an active or 'in use' data path. The first child client object 710*b* references a first handle 'H1' 712*b* and accesses the first real object 708*c* via a first mask 'M1' 714*b*.

In addition, because the first and second UI views 702 and 704 share a common client schema, the second UI view 704 can also access the first real object 708*c* via the first child client object 710*b*. As shown in FIG. 7, the second UI view 704 accesses the first child client object 710*b* via a second data path 718. When the first UI view 702 finishes using the first child client object 710*b*, the first data path 716 becomes inactive as shown in FIG. 7 by a dotted line. If no other UI view of the client application 706 requires access to the first child client object 710*b*, the client object 710*b* becomes available for garbage collection (e.g., available for unloading). However, because the second UI view 704 continues to access the first child client object 710*b*, the data path 718 remains active as indicated in FIG. 7 by a solid line, and the client object 710*b* does not become available for garbage collection. Data paths 720, 722, and 724 from the first child client object 710*b* to the first real object 708*c* also remain active as indicated by solid lines.

When a client object is no longer used by any user interface of a client application, all of the data paths associated with that client object become inactive and the client object and a corresponding handle and mask are flagged as ready for garbage collection and are subsequently unloaded by the client model 116. In addition, if the real object that was being accessed by that client object is no longer accessed by any other client object, that real object is also flagged as ready for garbage collection and is subsequently unloaded by the client model 116. For example, a second child client object 'O2' 710*c* that is initially instantiated or loaded for the first UI view 702 to access the second real object 708*d* subsequently becomes inactive and flagged as ready for garbage collection when it is no longer used by either of the UI views 702 or 704. A second object handle 714*c* and a second mask 714*c* also become flagged as ready for garbage collection. In this case, all of the data paths associated with the second child client object 710*c* become inactive as shown in FIG. 7 by dotted lines. Although the client model 116 unloads the second child client object 710*c*, the second object handle 712*c*, and the second mask 714*c*, the client model 116 may not unload the second real object 708*d* if another child client object is still using or still requires access to the second real object 708*d.*

After an instance of a particular client object is unloaded another instance of that client object may be loaded for any subsequent access to the process control data associated with that client object. For example, as shown in FIG. 7, after the second child client object 710*c* is unloaded (e.g., unloaded during garbage collection), the first UI view 702 may cause the parent object 710*a* to load or instantiate a second instance of the second child client object 'O2" 710*d* to access the second real object 708*d.*

In FIG. 8, each of the UI views 702 and 704 has its own separate client schema and accesses the real objects 216 using its own child client objects. For instance, the second UI view 704 instantiates or loads a client object 'O1"' 802, which is separate from all of the client objects used by the first UI interface 702. The example method described below in connection with FIGS. 31A and 31B may be used to form communication paths between the UI views 702 and 704 and the real objects 216 shown in FIGS. 7 and 8.

Figure 9:
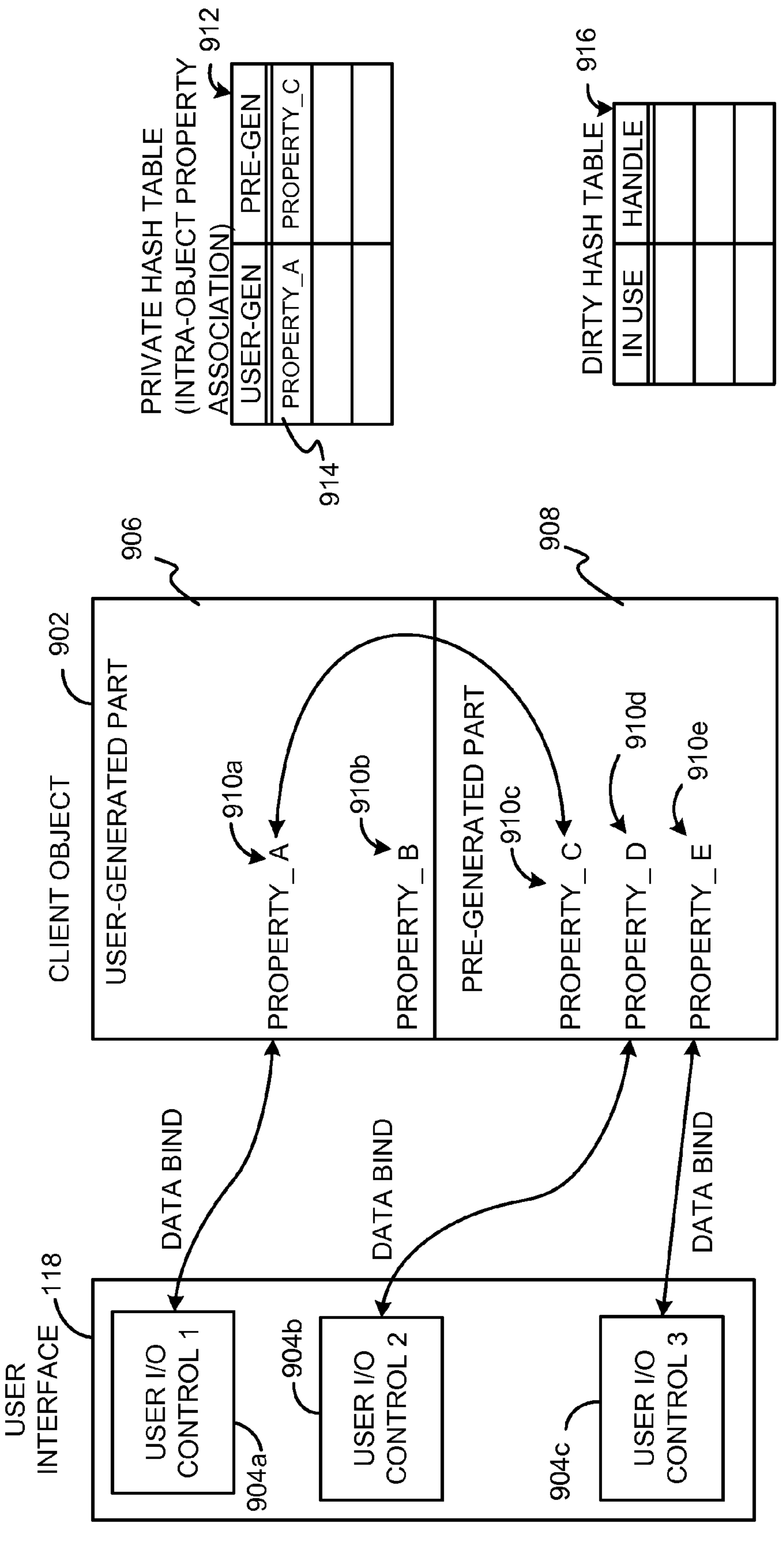
FIG. 9 is a block diagram depicting data binding between the user interface of FIGS. 1 and 2 and a client object.

FIG. 9 is a block diagram depicting data binding between the user interface 118 of FIGS. 1 and 2 and a client object 902 that is substantially similar or identical to one of the client objects 212 of FIG. 2. The user interface 118 in FIG. 9 is shown by way of example as having first, second, and third user I/O controls 904*a*, 904*b*, and 904*c* that are substantially similar or identical to the user I/O controls 204 of FIG. 2. For example, the user I/O controls 904*a-c* may be text boxes, list boxes, data fields, check boxes, etc. The client object 902 includes a user-generated class elements portion 906 and a pre-generated class elements portion 908. Class elements of the user-generated elements portion 906 are defined in a user-generated partial class (e.g., one of the user-generated partial classes 208 of FIG. 2) and class elements of the pre-generated class elements portion 908 are defined in a pre-generated partial class (e.g., one of the pre-generated partial classes 206 of FIG. 2). A plurality of properties 910*a*-910*e* described below are created based on the class elements of the user-generated and pre-generated portions 906 and 908.

The user-generated portion 906 includes a PROPERTY_A element 910*a* and a PROPERTY_B element 910*b*. The pre-generated portion 908 includes a PROPERTY_C element 910*c*, a PROPERTY_D element 910*d*, and a PROPERTY_E element 910*e*. The property elements 910*c-e* are used to retrieve stored process control data from the process control system database 110. The PROPERTY_A element 910*a* is associated with the PROPERTY_C element 910*c* and derives a value based on the PROPERTY_C element 910*c*. The client object 902 includes a private hash table 912 shown in FIG. 9 that includes the mappings or associations between user-generated elements (e.g., the property elements 910*a* and 910*b*) and pre-generated elements (e.g., the property elements 910*c-e*). The private hash table 912 may be referenced or accessed via a variable or pointer of type 'HashTable' that is private to the object 912. The association between the PROPERTY_A element 910*a* and the PROPERTY_C element 910*c* is shown in row 914 of the private hash table 912.

The user I/O controls 904*a-c* are data bound to PROPTERY_A element 910*a*, PROPERTY_D element 910*d*, and PROPERTY_E element 910*e*, respectively. Data binding the user I/O controls 904*a-c* in this manner causes the client application 108 to communicate data values between the user I/O controls 904*a-c* and their respective ones of the elements 910*a*, 910*d*, and 910*e* each time any of those data values are updated. For example, as described in greater detail below in connection with FIG. 32, the process control system database server 112 and the client model 116 may exchange update information (e.g., 'UpdateNotification' events and lists of questionable or dirty objects) regarding process control data that has been modified in the process control system database server 110. In this manner, the client object 902 may determine whether any of the modified process control data is associated with any of its property elements 910*c-d*, which are used to access stored process control data and, if so, updates the values of each of the property elements 910*c-d* for which a process control data value was modified. The client object 902 may then use the private hash table 912 to update the values of any of the user-generated properties (e.g., the properties 910*a* and 910*b*) that are associated with or use any of the property elements 910*c-d* for which process control data has been modified.

To update the values of the data bound user I/O controls 904*a-c* the client model 116 parses update information received via an update notification event to generate a 'PropertyChanged' event for any user-generated or pre-generated property for which process control data has been modified. The 'PropertyChanged' event then causes the data bound user I/O controls 904*a-c* to obtain modified process control data from a respective one of the properties 910*a-e* and update the values of the I/O controls 904*a-c*.

The client object 902 may also use the update information to populate a dirty hash table 916. The dirty hash table 916 is referenced via a variable or pointer of type 'HashTable' and is private to the object 902. The dirty hash table 916 is used to store dirty or questionable object handles for a client application (e.g., the client application 108 of FIG. 1). The dirty object handles are provided in the update information and indicate that process control data for some client objects has been in the process control system database 110. The client application 108 may use a 'PopulateDirtyHashTable' function to populate the dirty hash table 916 with the dirty object handles. For example, the 'PopulateDirtyHashTable' function first receives update information from the update notification event and then parses the update information and populates the dirty hash table 916 with the dirty handles.

FIG. 10 depicts example server schema XML source code 1000 that defines an example server schema. The server schema XML source code 1000 is stored in the process control system database server 112 and defines the arrangement or layout used to represent process control data by the process control system database server 112. The server schema XML source code 1000 contains class type definitions and enumeration definitions. Each class type has a name and contains a number of properties, roles, and commands. Each property has a name and data type.

A role has a name and the class type(s) it contains. A contained base type for items in a role is declared in a role element. Specific class subtypes are nested within the role element. Each contained class type is marked whether it can be created by a client application (e.g., the client application 108 of FIG. 1) via a command. A class type definition also contains commands that can be executed via command scripts obtained from, for example, the client application 108. Each command has a name and defines its parameters and return type.

As shown in FIG. 10, the server schema XML source code 1000 specifies a type named 'ControlModule' (line 1002). The type name 'ControlModule' (line 1002) contains a property named 'detailDisplayName' of data type string (line 1004) and a role named 'Blocks' of destination type 'BlockBase' (line 1006). The role name 'Blocks' (line 1006) contains a type named 'ModelUsage' that can be created by the client application 108 (line 1008). The type name 'ModelUsage' (line 1008) contains a plurality of creation parameters (lines 1010 and 1012) that are created when the client application 108 loads or instantiates an object of type 'ModelUsage'. The type name 'ControlModule' (line 1002) also contains a command named 'renameTo' of return type void (line 1014). The command name 'renameTo' (line 1014) contains a parameter named 'newName' of data type string (line 1016).

The server schema XML source code 1000 also specifies an enumeration definition. Specifically, the server schema XML source code 1000 includes an enum named 'DbeAttributeType' (line 1018). The enum name 'DbeAttributeType' (line 1018) contains a plurality of items that include an entry named 'Float' (line 1020) and an entry named 'FloatWithStatus' (line 1022).

An enumeration can be reference in the data type field of a property. For example, a type named 'Attribute' (line 1024) contains a property named 'attributeType' of data type 'DbeAttributeType' (line 1026), which corresponds to the enum name 'DbeAttributeType' (line 1018).

FIG. 11 is example XML source code 1100 that is returned by the process control system database server 112 to the client model 116 in response to a query submitted by the client model 116. Specifically, the example XML source code 1100 is returned in response to the query Site.PlantAreas [name='AREA_A'](index).Modules(name). As shown in FIG. 11, the results in the XML source code 1100 includes a ModelRole named 'PlantAreas' (line 1102). The ModelRole name 'PlantAreas' (line 1102) contains a PlantArea named 'AREA_A' (line 1104). The PlantArea name 'AREA_A' (line 1104) contains a property index (line 1106) that is set equal to zero and a ModelRole named 'Models' (line 1108). The ModelRole name 'Modules' (line 1108) contains a plurality of modules and a corresponding property for each. For example, the ModelRole name 'Modules' (line 1108) contains a ModuleInstanceBase named 'EM1' (line 1110), which contains a property named 'EM1' (line 1112).

Figure 12:
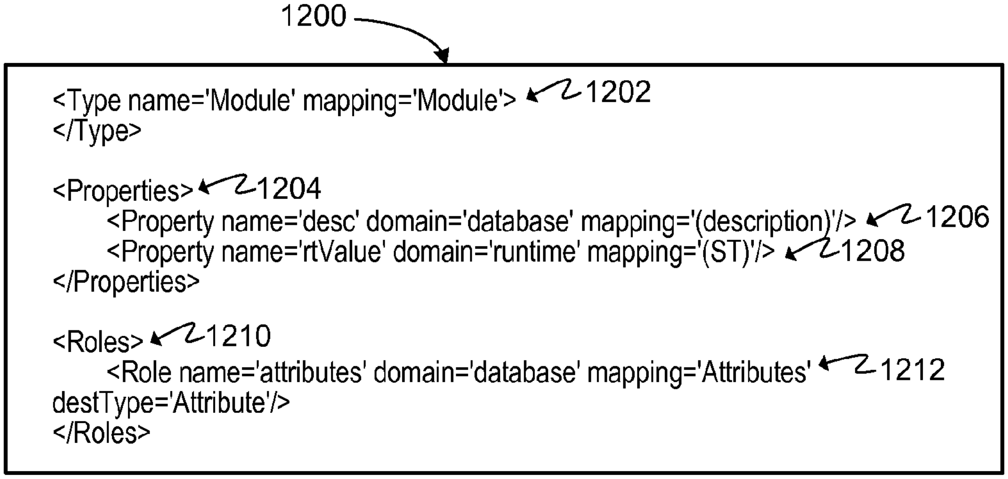
FIG. 12 depicts example client schema XML source code that may be used to map process control data from a server schema to a client schema.

FIG. 12 depicts example client schema XML source code 1200 that may be used to map process control data from a server schema (e.g., the server schema XML source code 1000 of FIG. 10 or one of the server schema hierarchies described below in connection with FIGS. 14, 17, 20, 23, 26, and 29) to a client schema (e.g., one of the client schema hierarchies described below in connection with FIGS. 14, 17, 20, 23, 26, and 29). A client schema defines types of properties, roles, and commands in a substantially similar manner as a server schema defines types. For each type, property, and role, client schema XML source code (e.g., the client schema XML source code 1200) indicates a mapping into a server schema so that the client model 116 (FIG. 1) can rearrange or map process control data between a client schema and a server schema.

As shown in FIG. 12, a type named 'Module' in a client schema is mapped to a type named 'Module' in a server schema (line 1202). In this case, the type named 'Module' in the client schema is also named 'Module' in the server schema. However, a type name in a client schema may map to a type name in a server schema having a different name. For example, a type name 'ModuleOne' may map to a type name 'ModuleTwo.'

A properties element (line 1204) may contain one or more property elements. Each property element defines one or more client properties of the client type and contains the name of each client property, the domain with which the client property is associated and the mapping to a server schema. As shown in FIG. 12, a property named 'desc' is associated with the database domain (e.g., the property corresponds to stored process control data that is stored in the process control system database 110) and is mapped to a property named 'description' in a server schema (line 1206). A property named 'rtValue' is associated with the runtime domain (e.g., the property corresponds to real-time process control data that can be obtained from the runtime server 114 of FIG. 1) and is mapped to a property named 'ST' in a server schema (line 1208). The property mappings are relative to the containing type. For example, if the containing type is 'Module', which is within the containing type 'Site', the query generated to retrieve the 'desc' property for MOD_X is Site.Modules[name='MOD_X'] (description).

A roles element (line 1210) contains one or more Role elements. Each Role element defines a client role associated a client type and contains the name of the client role, the domain with which the client role is associated, the mapping used to get the client role, and the type of the objects of the client role. As shown in FIG. 12, the roles element (line 1210) contains a role named 'attributes' that is associated with the database domain (e.g., the role corresponds to stored process control data that is stored in the process control system database 110) and is mapped to a role named 'Attributes' in a server schema (line 1212). The role mappings are relative to the containing type. For example, if the containing type is 'Module', which is contained within a containing type 'Site', the query generated to retrieve the 'attributes' role for MOD_X is Site.Modules[name='MOD_X'].Attributes.

FIGS. 13 through 29 depict example user interfaces, schema mapping configurations, and example XML source code that may be used to map class elements such as objects and roles from a server schema that resides on a server (e.g., the process control system database server 112 or the runtime server 114 of FIG. 1) to a client schema that resides in a client application (e.g., the client application 108 of FIG. 1). The mapping configurations described below may be implemented by the client model 116 to abstract a client application from process control system servers. By mapping class elements from a server schema to a client schema via the client model 116, a client application may be configured to be communicatively coupled to and work with a plurality of servers. Further, developing client applications based on the client model 116 using schema mapping configurations as described below enables a plurality of applications, each having particular process control data requirements, to be communicatively coupled to and work with a process control system server.

Figure 13:
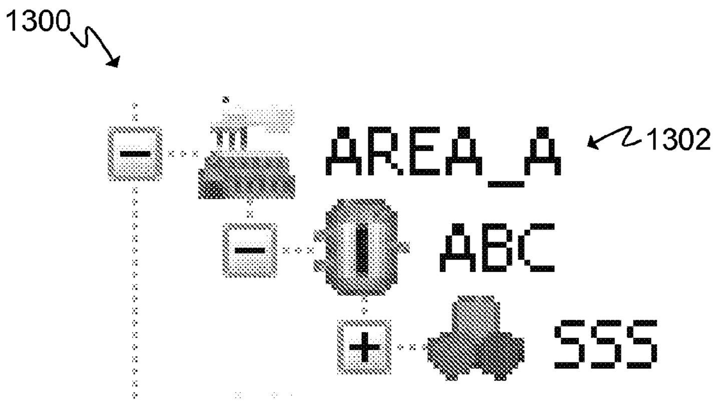
FIG. 13 depicts an example user interface that represents an object and the roles contained therein.

FIG. 13 depicts an example user interface 1300 that represents an object and the roles contained therein. The example user interface 1300 shows a unit module 'AREA_A' 1302 as one complete object. However, in the process control system database 110 (FIG. 1), the unit module 'AREA_A' 1302 is stored as two separate objects. A first object contains the behavior of the unit module 'AREA_A' 1302 and the second object contains module container behavior that defines how other modules can be nested within the unit module 'AREA_A' 1302.

Figure 14:
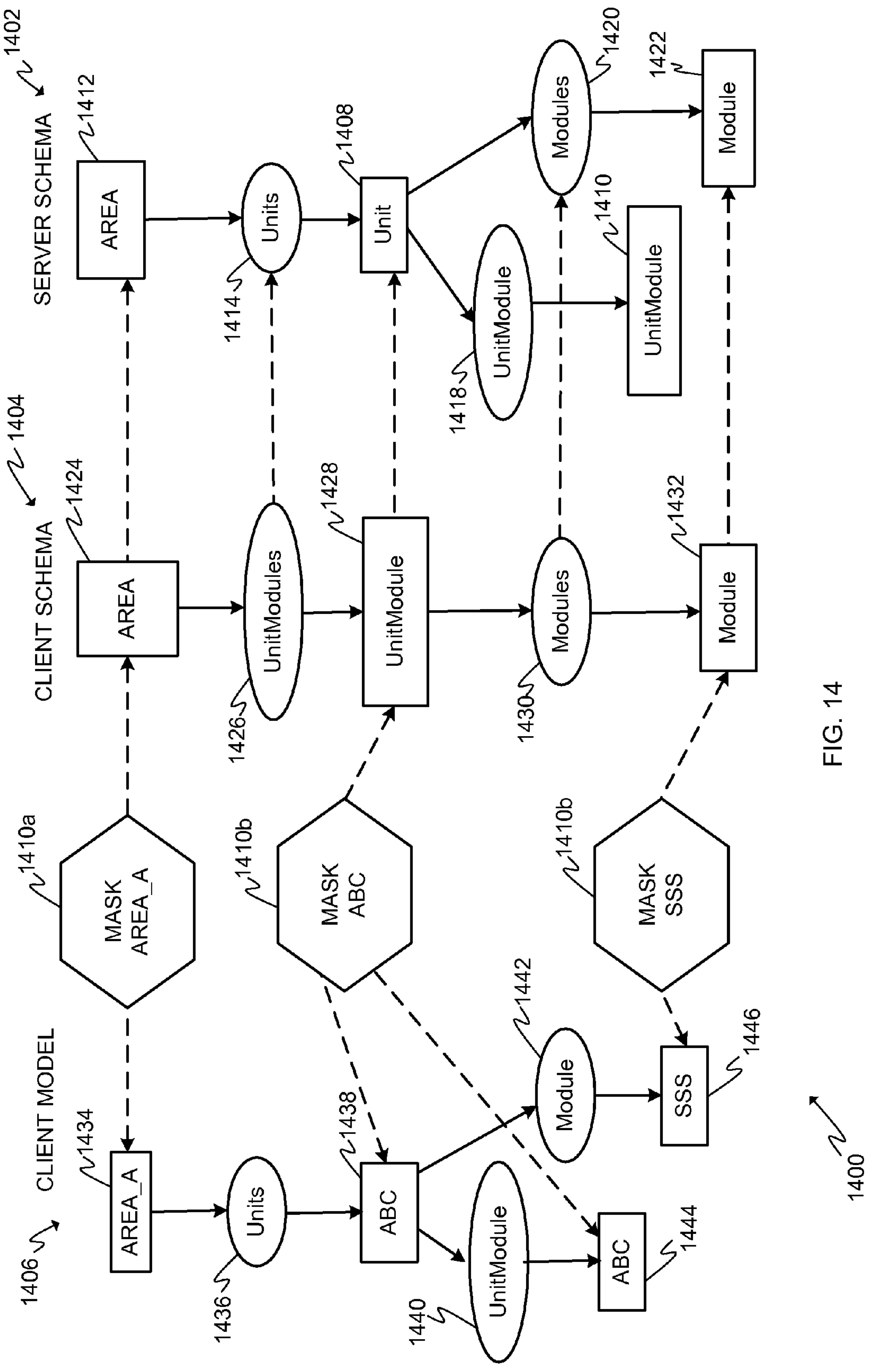
FIG. 14 is a detailed block diagram depicting a mapping configuration between a client schema and a server schema to generate the example user interface of FIG. 13.

FIG. 14 is a detailed block diagram depicting a mapping configuration 1400 between a client schema and a server schema to generate the example user interface 1300 of FIG. 13. The mapping configuration 1400 may be implemented by the client model 116 (FIG. 1). Specifically, FIG. 14 shows a server schema hierarchy 1402, a client schema hierarchy 1404, and a client model hierarchy 1406 in a one-to-one mapping configuration. The server schema hierarchy 1402 indicates the distinction between a server object of type 'Unit' 1408 and a server object of type 'UnitModule' 1410 as stored in the process control system database 110 (FIG. 1). The hierarchy of the client model hierarchy 1406 follows, is substantially similar to, or is identical to the hierarchy of the server schema hierarchy 1402. The client schema hierarchy 1404 represents only those objects and roles of interest from the server schema hierarchy 1402 by using masks 1410*a*, 1410*b*, and 1410*c* that provide pointers into the client model hierarchy 1406.

The server schema hierarchy 1402 includes a server object of type 'AREA' 1412 that contains a server role of type 'Units' 1414. The server role 'Units' 1414 leads to the server object 'Unit' 1408 that contains a server role of type 'UnitModule' 1418 and a server role of type 'Modules' 1420. The server role 'UnitModule' 1418 leads to the server object 'UnitModule' 1410 and the server role 'Modules' 1420 leads to a server object of type 'Module' 1422.

The client schema hierarchy 1404 includes a client object of type 'AREA' 1424 that contains a client role of type 'UnitModules' 1426. The client role 'UnitModules' 1426 leads to a client object of type 'UnitModules' 1428 that contains a client role of type 'Modules' 1430. The client role 'Modules' 1430 leads to a client object of type 'Module' 1432. The client objects and client roles are mapped to the server objects and server roles via real objects and roles of the client model hierarchy 1406 and the masks 1410*a-c* as described below in connection with FIG. 15.

The client model hierarchy 1406 includes a plurality of real objects and real roles that are arranged substantially similarly or identically to the server schema hierarchy 1402. The client model hierarchy 1406 includes a real object of type 'AREA_A' 1434 that corresponds to the server object 'AREA' 1412. The real object 'AREA_A' 1434 contains a real role of type 'Units' 1436 that corresponds to the server role 'Units' 1414. The real role 'Units' 1436 leads to a real object of type 'ABC' 1438 that corresponds to the server object 'Unit' 1408. The real object 'ABC' 1438 contains a real role of type 'UnitModule' 1440 that corresponds to the server role 'UnitModule 1418 and a real role of type 'Module' 1442 that corresponds to the server role 'Modules' 1420. The real role 'UnitModule' 1440 leads to a real object 'ABC' 1444 that corresponds to the server object 'UnitModule' 1410. The role 'Module' 1442 leads to a real object 'SSS' 1446 that corresponds to the server object 'Module' 1422.

Figures 15, 16:
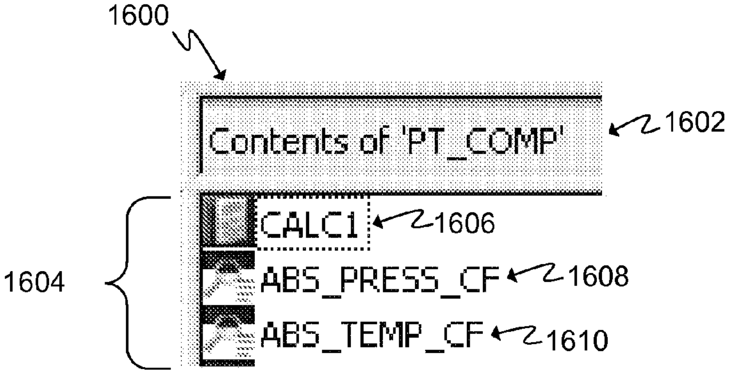
FIG. 15 depicts example XML source code that may be used to generate the mappings from the server schema hierarchy to the client schema hierarchy of FIG. 14.
FIG. 16 depicts an example user interface that represents a composite function block 'PT_COMP' containing a function block and two attributes.

FIG. 15 depicts example XML source code 1500 that may be used to generate the mappings from the server schema hierarchy 1402 to the client schema hierarchy 1404 of FIG. 14. The XML source code 1500 shows that the client object 'AREA' 1424 (FIG. 14) is mapped to the server object 'AREA' 1412 (FIG. 14) (line 1502). To map the client object 'AREA' 1424 to the server object 'AREA' 1412, the client model 116 maps the real object 'AREA_A' 1434 to the client object 'AREA' 1424 via the mask 'AREA_A' 1410*a*. In this manner, the client object 'AREA' 1424 accesses the server object 'AREA' 1412 via the real object 'AREA_A' 1434 as if the client object 'AREA' 1424 were directly accessing the server object 'AREA' 1412.

The client object 'AREA' 1424 contains the client role 'UnitModules' 1426 (FIG. 14) that is mapped to the server role 'Units' 1414 (FIG. 14) and that leads to the client object 'UnitModules' 1428 (FIG. 14) (line 1504). A client object in the client schema hierarchy 1404 can have the same name as a server object in the server schema hierarchy 1402 even if the client object does not map to the same named server object. For example, the client object 'UnitModules' 1428 is mapped to the server object 'Unit' 1408 (FIG. 14) (line 1506). In this case, the client model 116 maps the client object 'UnitModules' 1428 to the real object 'ABC' 1438 via the mask'ABC' 1410*b*.

The client object 'UnitModules' 1428 contains a property named 'scanRate' that is mapped to a 'scanRate' property of the server object 'UnitModules' 1410 (i.e., 'UnitModule(scanRate)') (line 1508). In this case, the client model 116 maps the 'scanRate' of the real object 'ABC' 1444 to the 'scanRate' property of the client object 'UnitModule' 1428 via the mask 'ABC' 1410*b*. By mapping the 'scanRate' property of the real object 'ABC' 1444 to the 'scanRate' property of the client object 'UnitModule' 1428 via the mask 'ABC' 1410*b*, the client model 116 traverses the server role 'UnitModule' 1418 (FIG. 14) from the server object 'Unit' 1408 to map the 'scanRate' property of the client object 'UnitModules' 1428 to the 'scanRate' property of the server object 'UnitModules' 1410.

The object 'UnitModules' 1420 contains the client role 'Modules' 1430 (FIG. 14) that is mapped to the server role 'Modules' 1420 (FIG. 14) and leads to the client object 'Module' 1432 (FIG. 14) (line 1510).

FIG. 16 depicts an example user interface 1600 that represents a composite function block 'PT_COMP' 1602 containing a function block and two attributes. As shown in the user interface 1600, the composite function block 'PT_COMP' 1602 includes a unified list 1604 of items that contains a function block 'CALC1' 1606, an attribute 'ABS_PRESS_CF' 1608, and an attribute 'ABS_TEMP_CF' 1610. If a user chooses to display a unified list of objects, the client model 116 may be configured to map a client role to two or more server roles. As described below in connection with FIG. 17, in a server schema (e.g., the server schema hierarchy 1702 of FIG. 17) the object corresponding to the function block 'CALC1' 1606 is associated with a different server role than the objects corresponding to the attribute 'ABS_PRESS_CF' 1608 and the attribute 'ABS_TEMP_CF' 1610. However, in a client schema (e.g., the client schema hierarchy 1704 of FIG. 17), the objects corresponding to the function block 'CALC1' 1604, the attribute 'ABS_PRESS_CF' 1606, and the attribute 'ABS_TEMP_CF' 1608 are all represented as being part of the same client role.

Figure 17:
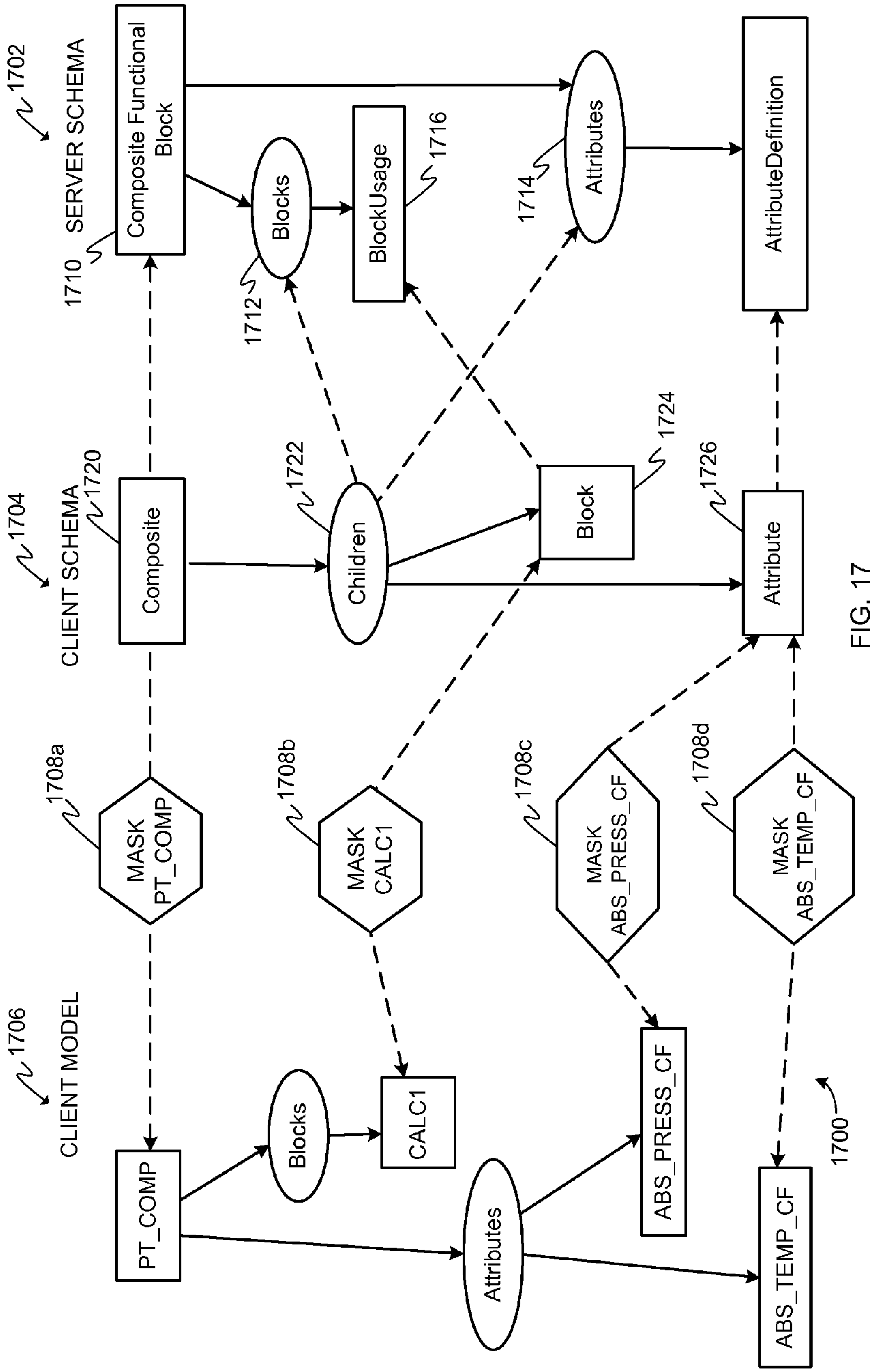
FIG. 17 is a detailed block diagram depicting a mapping configuration between a server schema hierarchy and a client schema hierarchy that maps a single client role to a plurality of server roles to generate the example user interface of FIG. 16.

FIG. 17 is a detailed block diagram depicting a mapping configuration 1700 between a server schema hierarchy 1702 and a client schema hierarchy 1704 that maps a single client role to a plurality of server roles to generate the example user interface 1600 of FIG. 16. The mapping described in the mapping configuration may be performed by the client model 116 (FIG. 1). The mapping configuration 1700 maps the client schema hierarchy 1704 to the server schema hierarchy 1702 via a client model hierarchy 1706 and a plurality of masks 1708*a-d*. The server schema hierarchy 1702 includes a server object of type 'Composite Function Block' 1710 containing two server roles: a server role of type 'Blocks' 1712 and a server role of type 'Attributes' 1714. The server role 'Blocks' 1712 leads to a client object of type 'BlockUsage' 1716 and the server role 'Attributes' 1714 leads to a client object of type 'AttributeDefinitions' 1718. As shown, the client model hierarchy 1706 follows the server schema hierarchy 1702.

The client schema hierarchy 1704 includes a client object of type 'Composite' 1720 that contains a client role of type 'Children' 1722. The client role 'Children' 1722 leads to a client object of type 'Block' 1724 and a client object of type 'Attribute' 1726.

Figures 18, 19:
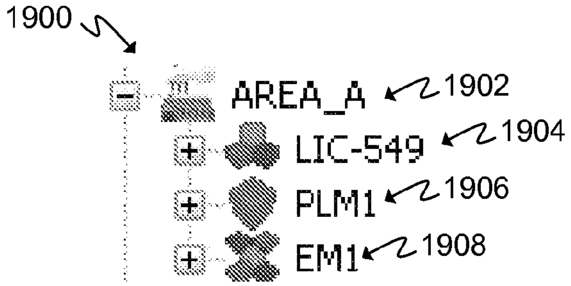
FIG. 18 depicts example XML source code that may be used to generate the mappings from the server schema hierarchy to the client schema hierarchy of FIG. 17.
FIG. 19 depicts an example user interface that represents a plurality of different control devices within a particular plant area.

FIG. 18 depicts example XML source code 1800 that may be used to generate the mappings from the server schema hierarchy 1702 to the client schema hierarchy 1704 of FIG. 17. The XML source code 1800 maps the client object 'Composite' 1720 (FIG. 17) to the server object 'Composite Function Block' 1710 (FIG. 17) (line 1802). The client role 'Children' 1722 contained within the client object 'Composite' 1720 (line 1804) maps to two server roles. In particular, the client role 'Children' 1722 maps to the server role 'Blocks' 1712 (line 1806) and to the server role 'Attributes' 1714 (line 1808). For the mapping to the server role 'Blocks' 1712, the client role 'Children' 1722 leads to the client object 'Block' 1724 (line 1806). For the mapping to the server role 'Attributes' 1714, the client role 'Children' 1722 leads to the client object 'Attribute' 1726 (line 1808). The client role 'Block' 1724 maps to the server object 'BlockUsage' 1716 (line 1810) and the client role 'Attribute' 1726 maps to the server object 'AttributeDefinition' 1718 (line 1812).

FIG. 19 depicts an example user interface 1900 that represents a plurality of different control devices within a particular plant area 'AREA_A' 1902. Specifically, the plant area 'AREA_A' 1902 includes a 'LIC-549' control device 1904, a 'PLM1' control device 1906, and an 'EM1' control device 1908. As described below in connection with FIGS. 20 and 21, the control devices 1904, 1906, and 1908 are represented in a client schema (e.g., the client schema hierarchy 2004 of FIG. 20) as three separate client roles that are mapped to a single server role in a server schema (e.g., the server schema hierarchy 2002 of FIG. 20).

Figure 20:
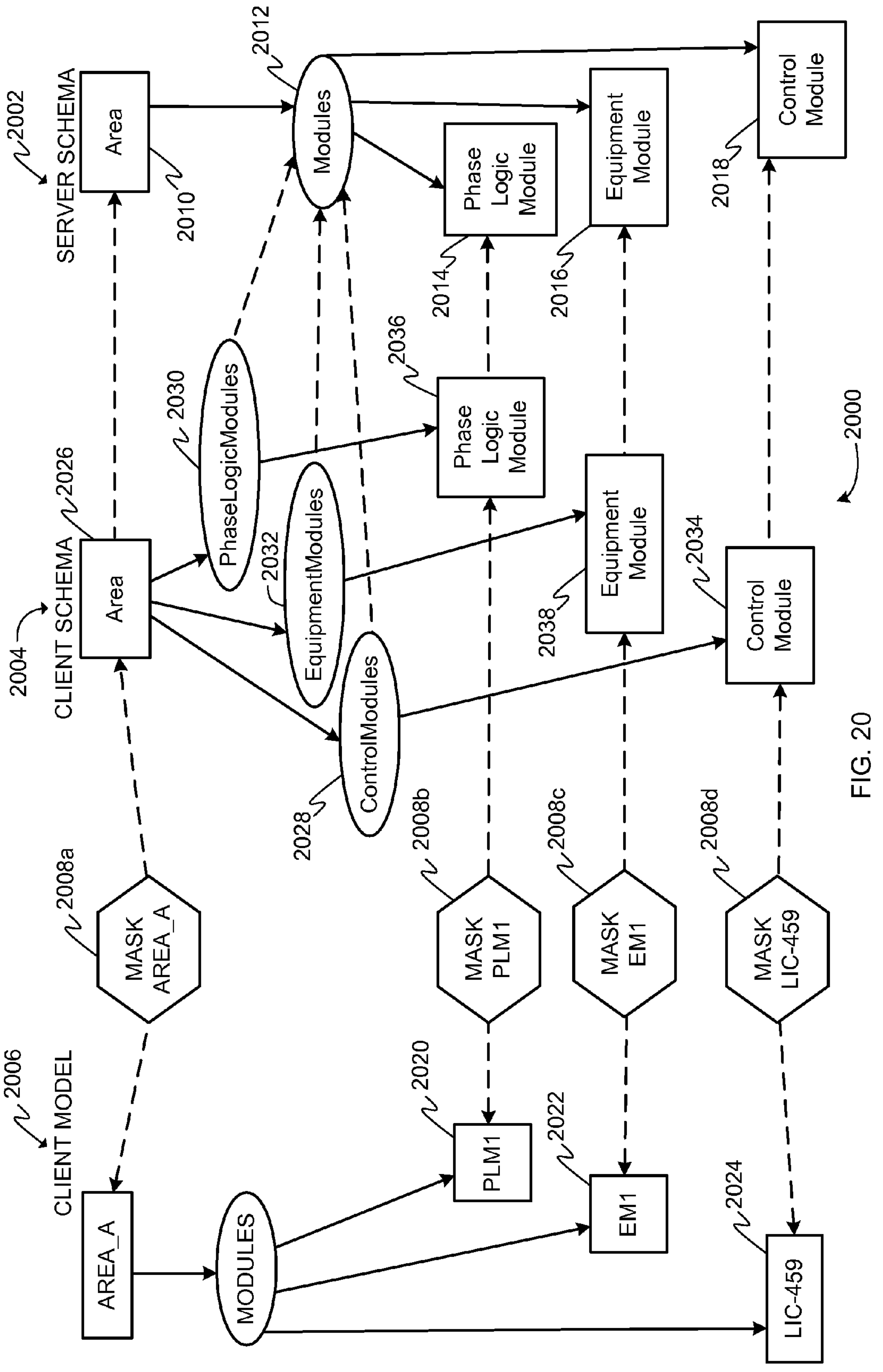
FIG. 20 is a detailed block diagram depicting a mapping configuration between a server schema hierarchy and a client schema hierarchy that maps a plurality of client roles to a single server role to generate the example user interface of FIG. 19.

FIG. 20 is a detailed block diagram depicting a mapping configuration 2000 between a server schema hierarchy 2002 and a client schema hierarchy 2004 that maps a plurality of client roles to a single server role to generate the example user interface 1900 of FIG. 19. The mapping configuration 2000 maps the client schema hierarchy 2004 to the server schema hierarchy 2002 via a client model hierarchy 2006 and a plurality of masks 2008*a-d*. The server schema hierarchy 2002 includes a server object of type 'Area' 2010 that contains a server role of type 'Modules' 2012. The server role 'Modules' 2012 leads to a server object of type 'Phase Logic Module' 2014, a server object of type 'Equipment Module' 2016, and a server object of type 'Control Module' 2018. The client model hierarchy 2006 includes a real object of type 'PLM1' 2020, a real object of type 'EM1' 2022, and a real object of type 'LIC-459' 2024 that correspond to the server object 'Phase Logic Module' 2014, the server object 'Equipment Module' 2016, and the server object 'Control Module' 2018, respectively. The real object 'PLM1' 2020, the real object 'EM1' 2022, and the real object 'LIC-459' 2024 also correspond respectively to the 'LIC-549' control device 1904, the 'PLM1' control device 1906, and the 'EM1' control device 1908 shown in the user interface 1900.

The client schema hierarchy 2004 includes a client object of type 'Area' 2026 that leads to a client role of type 'ControlModules' 2028, a client role of type 'PhaseLogicModules' 2030, and a client role of type 'EquipmentModules' 2032. The client role 'ControlModules' 2028 leads to a client object of type 'Control Module' 2034. The client role 'PhaseLogicModules' 2030 leads to a client object of type 'Phase Logic Module' 2036. The client role 'EquipmentModule' 2032 leads to a client object of type 'Equipment Module' 2038.

Figures 21, 22:
FIG. 21 depicts example XML source code that may be used to generate the role mappings from the server schema hierarchy to the client schema hierarchy of FIG. 20.
FIG. 22 depicts an example user interface that may be used to selectively display items associated with a control device.

FIG. 21 depicts example XML source code 2100 that may be used to generate the role mappings from the server schema hierarchy 2002 to the client schema hierarchy 2004 of FIG. 20. As shown in the XML source code 2100, the client role 'ControlModules' 2028 is mapped to the server role 'Modules' 2006 (line 2102). Also, the client role 'PhaseLogicModules' 2030 is mapped to the server role 'Modules' 2006 (line 2104). Additionally, the client role 'EquipmentModules' 2032 is mapped to the server role 'Modules' 2006 (line 2106).

FIG. 22 depicts an example user interface 2200 that may be used to selectively display items associated with a control device. For example, the user interface 2200 shows a 'CH01' control device 2202 and displays only one property, a property 'CTLR1C01CH01' 2204, associated with the 'CH01' control device 2202 even though the 'CH01' control device 2202 is associated with at least two properties in a server schema (e.g., the server schema hierarchy 2302 of FIG. 23). As described in greater detail below, a client schema (e.g., the client schema hierarchy 2304 of FIG. 23) may be mapped to a subset of server objects in a server schema (e.g., the server schema hierarchy 2302) so that a client application (e.g., the client application 108 of FIG. 1) displays only that subset of objects as shown in the user interface 2200.

Figure 23:
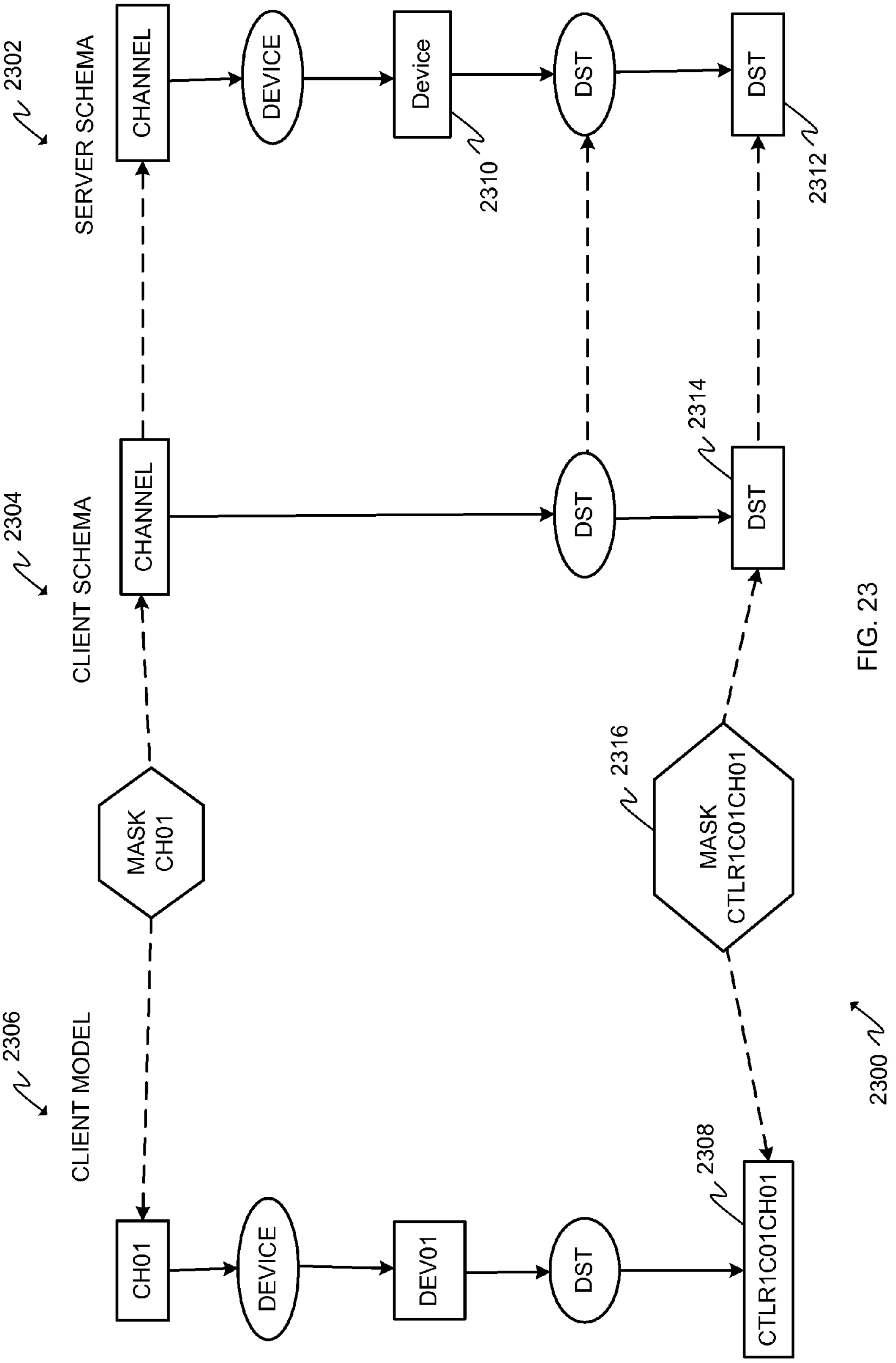
FIG. 23 is a detailed block diagram depicting a mapping configuration between a server schema hierarchy and a client schema hierarchy that maps a client object to a subset of server objects to generate the example user interface of FIG. 22.

FIG. 23 is a detailed block diagram depicting a mapping configuration 2300 between a server schema hierarchy 2302 and a client schema hierarchy 2304 that maps a client object to a subset of server objects to generate the example user interface 2200 of FIG. 22. A client model hierarchy 2306 includes a real object of type 'CTLRC01CH01' 2308 that corresponds to the property 'CTLR1C01CH01' 2204 of FIG. 22. The server schema hierarchy 2302 includes a server object of type 'Device' 2310 and a server object of type 'DST' 2312. The client schema hierarchy 2304 includes a client object of type 'DST' 2314. As indicated in example XML source code 2400 of FIG. 24, the client object 'DST' 2314 is mapped to the server object 'DST' 2312 (line 2402). The client object 'DST' 2314 is mapped to the server object 'DST' 2312 via the real object 'CTLRC01CH01' 2308 and a mask 'CTLR1C01CH01' 2316.

Figures 24, 25:
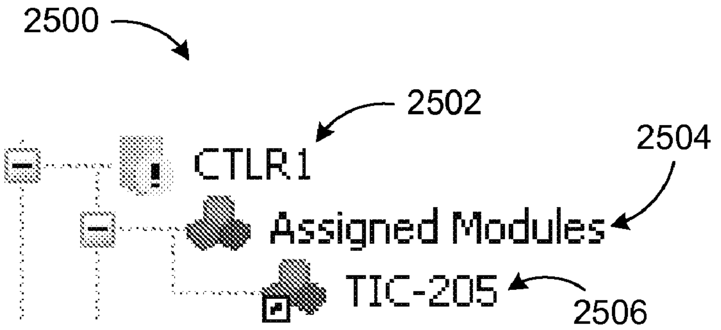
FIG. 24 depicts example XML source code that may be used to generate the object mappings from the server schema hierarchy to the client schema hierarchy of FIG. 23.
FIG. 25 depicts an example user interface that may be used to insert additional items into a control device view even though the additional items are not part of a server schema for that control device.

FIG. 25 depicts an example user interface 2500 that may be used to insert additional items into a control device view even though the additional items are not part of a server schema for that control device. The user interface 2500 includes a 'CTLR1' control device 2502 that is shown as having an 'Assigned Modules' item 2504 and a 'TIC-205' item 2506. As described below in connection with FIG. 26, a server schema (e.g., the server schema 2602 of FIG. 26) does not include a server object that corresponds to the 'Assigned Modules' item 2504. Instead, a client object corresponding to the 'Assigned Modules' item 2504 is inserted into a client schema (e.g., the client schema 2604 of FIG. 26).

Figure 26:
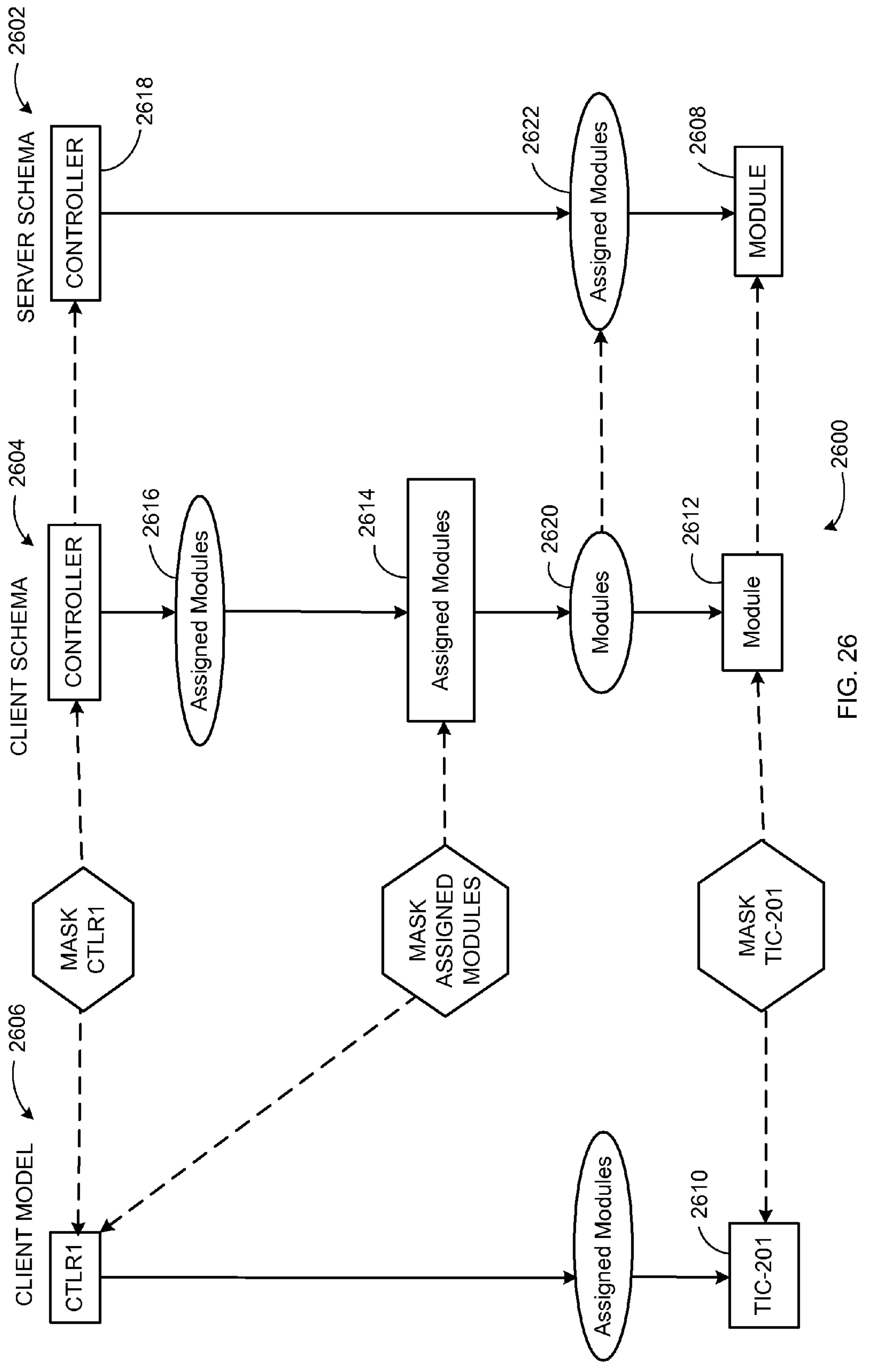
FIG. 26 is a detailed block diagram depicting a mapping configuration between a server schema hierarchy and a client schema hierarchy that inserts a client object into the client schema hierarchy.

FIG. 26 is a detailed block diagram depicting a mapping configuration 2600 between a server schema hierarchy 2602 and a client schema hierarchy 2604 that inserts a client object into the client schema hierarchy 2602. Each of the server schema hierarchy 2602 and a client model hierarchy 2606 includes a single object. Specifically, the server schema hierarchy 2602 includes a server object of type 'Module' 2608 and the client model hierarchy 2606 includes a real object of type 'TIC-201' 2610 that corresponds to the server object 'Module' 2608 and the 'TIC-205' item 2506 (FIG. 25). The client schema hierarchy 2604 includes a client object 'Module' 2612 that corresponds to the server and client model objects 2608 and 2610. In addition, a client application (e.g., the client application 108 of FIG. 1) has inserted a client object of type 'AssignedModules' 2614.

FIG. 27 depicts example XML source code 2700 for inserting the client object 'AssignedModules' 2614 (FIG. 26) into the client schema hierarchy 2604 (FIG. 26). Specifically, to create the client object 'Assigned Modules' 2614, the example XML source code 2700 specifies that a client role of type 'AssignedModules' 2616 (FIG. 26) has no server schema mapping (e.g., Role name='AssignedModules' mapping=' ') and that the client role 'AssignedModules' 2616 leads to the client object 'AssignedModules' 2614 (line 2702). To insert the client object 'AssignedModules' 2614 into the client schema hierarchy 2604, the example XML source code 2700 specifies that the client object 'AssignedModules' 2614 is pseudo mapped to a server object of type 'Controller' 2618 (e.g., a parent object of the server schema hierarchy 2602) (line 2704). The client object 'AssignedModules' 2614 contains a client role of type 'Modules' 2620 (FIG. 26) that is mapped to a server role of type 'AssignedModules' 2622 (FIG. 26) (line 2706).

FIG. 28 depicts an example user interface 2800 that may be used to display items for which real-time process control data can be obtained via a command. The user interface 2800 includes a fieldbus port 'P01' 2802 that contains control devices from which real-time process control data can be obtained via the runtime server 114 (FIG. 1). Specifically, the fieldbus port 'P01' 2802 contains 'Decomissioned Fieldbus Devices' 2804, which includes a control device 'D1' 2806. The control device 'D1' 2806 is implemented in a client schema (e.g., the client schema hierarchy 2902 of FIG. 29) as a command as described below in connection with FIG. 29.

Figure 29:
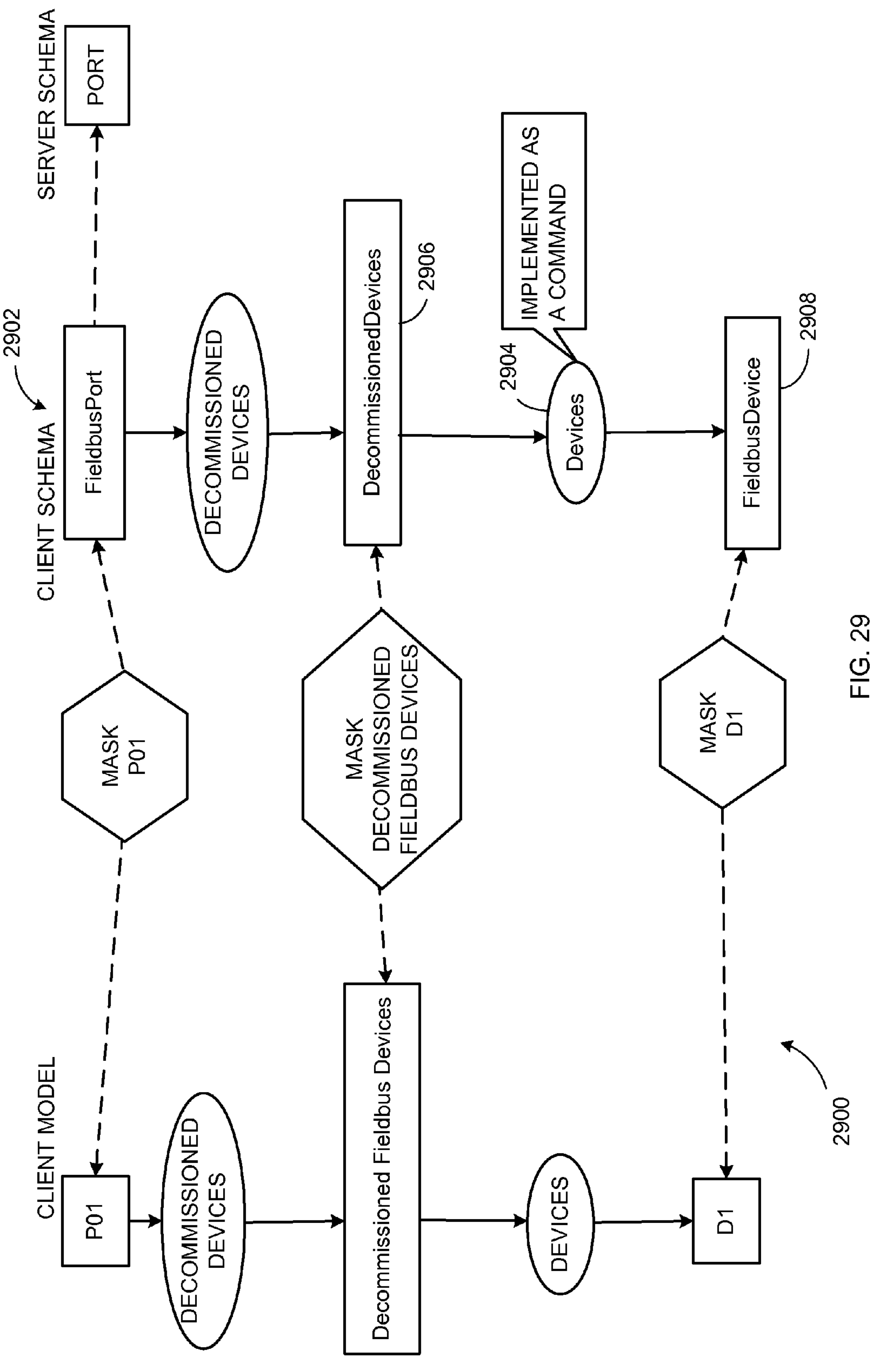
FIG. 29 is a detailed block diagram depicting a mapping configuration that implements a client role as a command.

FIG. 29 is a detailed block diagram depicting a mapping configuration that implements a client role as a command. A client schema hierarchy 2902 includes a client role of type 'Devices' 2904 that is implemented as a command. The client role 'Devices' 2904 may be used to obtain real-time process control data from the runtime server 114 of FIG. 1. Example XML source code 3000 of FIG. 30 specifies that a client of object type 'DecommissionedDevices' 2906 (FIG. 29) (line 30 of FIG. 30) contains the client role 'Devices' 2904 (FIG. 29). The example XML source code 3000 also specifies that the client role 'Devices' 2904 is implemented using command instructions stored in a file 'commands.dll' (e.g., assembly='commands.dll') and that the specific command that implements the client role 'Devices' 2904 is 'GetDecomissionedDevices' (line 3004). The client role 'Devices' 2904 leads to a client object of type 'FieldbusDevices' 2908 (FIG. 29) (line 3004 of FIG. 30), which has no mapping into a server schema hierarchy 2910 (FIG. 29) (line 2006 of FIG. 30).

Figure 31A:
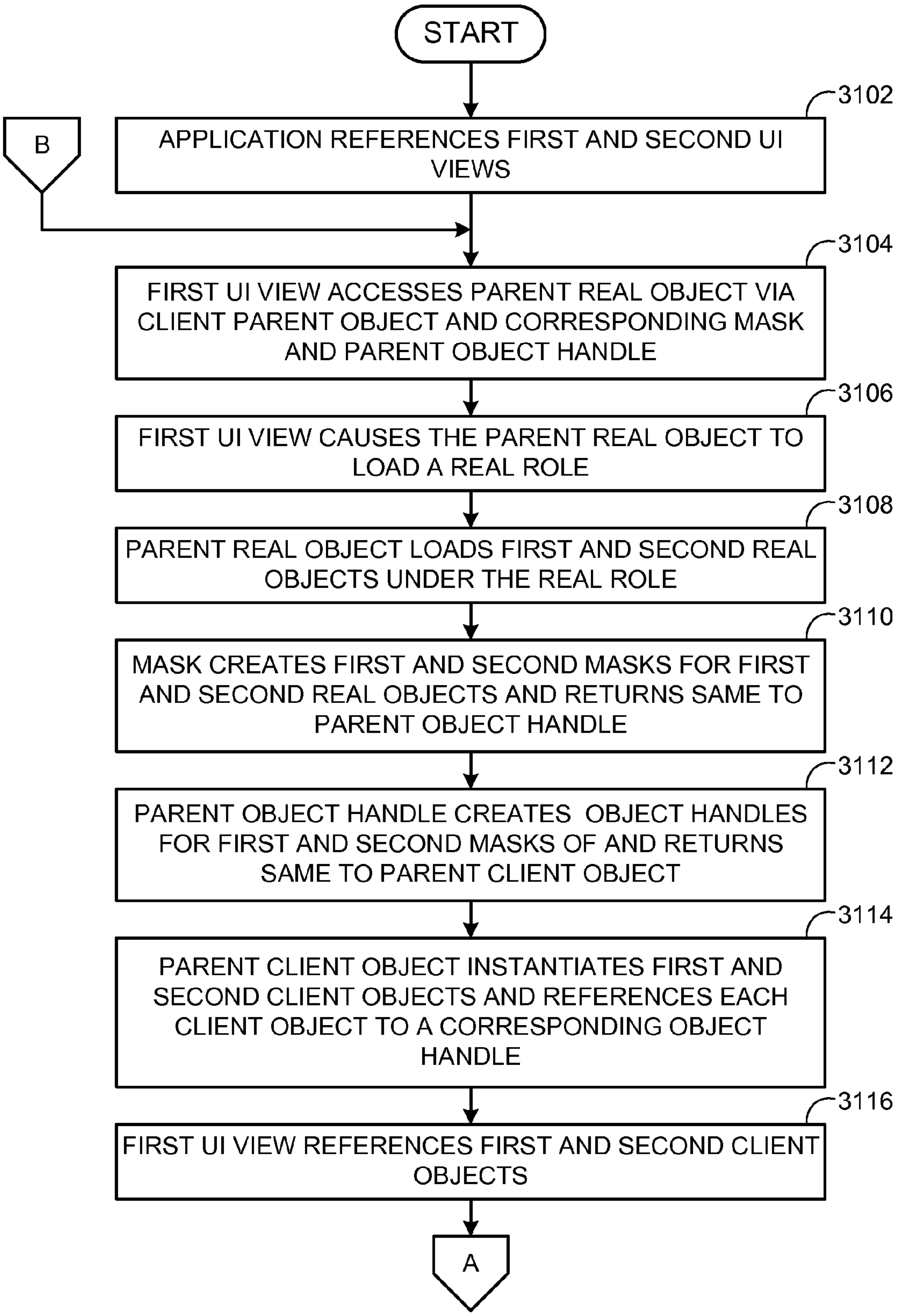
FIGS. 31A and 31B depict flow diagrams of example methods that may be used to provide a client application access to real objects via client objects during a runtime phase.
Figure 31B:
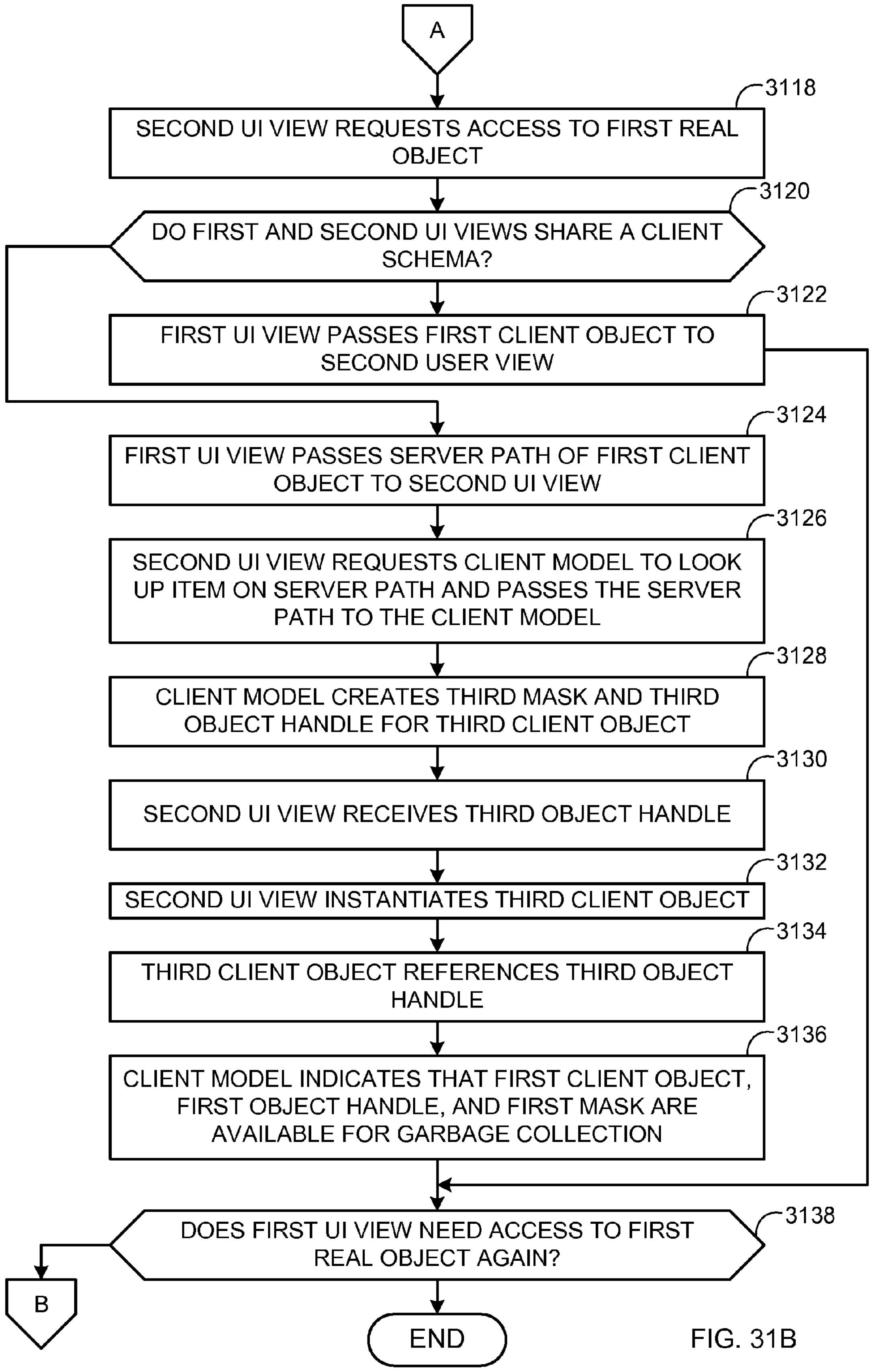
Figure 32:
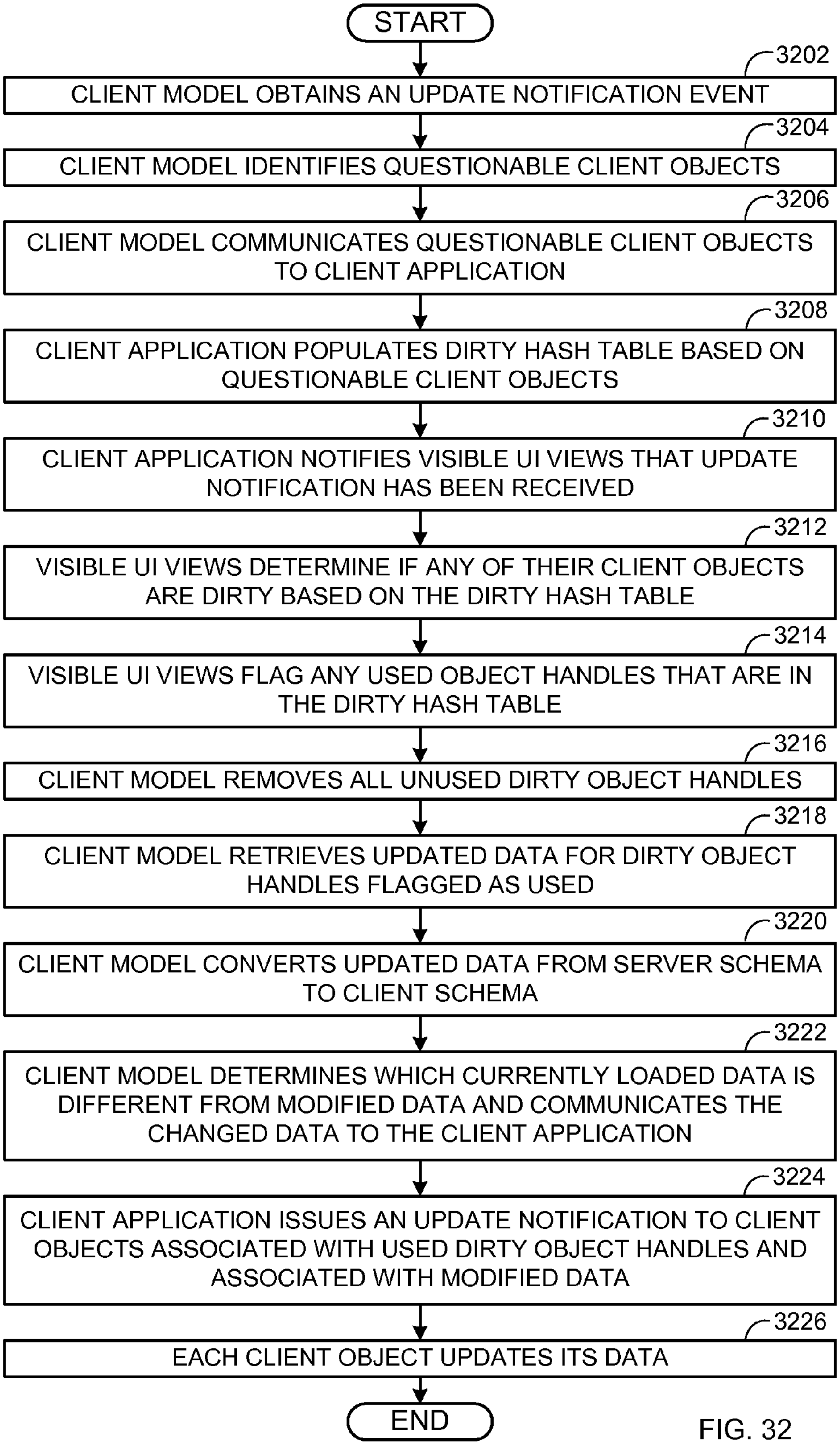
FIG. 32 is an example method that may be used to update modified process control data in client objects.

FIGS. 31A, 31B, and 32 illustrate flowcharts representative of example machine readable and executable instructions for implementing the example client application 108, the example client model 116, and the example user interface 118 of FIGS. 1 and 2. In these examples, the machine readable instructions comprise a program for execution by a processor such as the processor 3312 shown in the example processor system 3310 of FIG. 33. The program may be embodied in software stored on a tangible medium such as a CD-ROM, a floppy disk, a hard drive, a digital versatile disk (DVD), or a memory associated with the processor 3312 and/or embodied in firmware or dedicated hardware in a well-known manner. For example, any or all of structures within the example client application 108, the example client model 116, and the example user interface 118 of FIGS. 1 and 2 could be implemented by software, hardware, and/or firmware. Further, although the example program is described with reference to the flowcharts illustrated in FIGS. 31A, 31B, and 32, persons of ordinary skill in the art will readily appreciate that many other methods of implementing the example client application 108, the example client model 116, and the example user interface 118 of FIGS. 1 and 2 may alternatively be used. For example, the order of execution of the blocks may be changed, and/or some of the blocks described may be changed, eliminated, or combined.

FIGS. 31A and 31B depict flow diagrams of example methods that may be used to provide a client application (e.g., the client application 108 of FIG. 1) access to real objects (e.g., the real objects 216 of FIGS. 2, 7, and 8) via client objects (e.g., the client objects 212 of FIGS. 2, 7, and 8) during a runtime phase. Initially, the client application 108 references first and second UI views (e.g., the first and second UI views 702 and 704 of FIG. 7) (block 3102). The first UI view 702 then requests access to a real parent object (e.g., the parent real object 'R' 708*a* of FIG. 7) via a parent client object (e.g., the parent client object 'O' 710*a* of FIG. 7) and corresponding parent object handle and mask (e.g., the parent object handle 'H' 712*a* and the zeroth mask 'M' 714*a* of FIG. 7) (block 3104). For example, the first UI view 702 can issue a call to use the parent client object 'O' 710*a*. The parent client object 'O' 710*a* can then respond by referencing the parent object handle 'H' 712*a*, which in turn references the zeroth mask 'M' 714*a*. The mask reference 'M' 714*a* then references the parent real object 'R' 708*a* and a communication path is established between the first UI view 702 and the parent real object 'R' 708*a* as shown in FIG. 7.

The first UI view 702 then causes the parent real object 'R' 708*a* to load a real role (e.g., the 'ModuleLibrary' real role 708*b* of FIG. 7) (block 3106). For example, the first UI view 702 calls a load role on the parent client object 'O' 710*a* and passes the role name 'ModuleLibrary'. The parent client object 'O' 710*a* then fetches the real role from the parent object handle 'H' 712*a* and the parent object handle 'H' 712*a* causes the zeroth mask 'M' 714*a* to load the 'ModuleLibrary' real role 708*b*.

The parent real object 'R' 708*a* then loads the first and second real objects 708*c* and 708*d* under the 'ModuleLibrary' real role 708*b* (block 3108). The zeroth mask 'M' 714*a* then creates masks (e.g., the first and second masks 714*a* and 714*b* of FIG. 7) for the first and second real objects 708*c* and 708*d* and returns the masks to the parent object handle 'H' 712*a* (block 3110). The parent object handle 'H' 712*a* then creates object handles (e.g., the second object handles 712*b* and 712*c* of FIG. 7) for the first and second masks 714*b* and 714*c* and returns the object handles to the parent client object 'O' 710*a* (block 3112).

The parent client object 'O' 710*a* then instantiates the first and second child client objects 710*b* and 710*c* (FIG. 7) and references each of the child client objects 710*a-b* to a corresponding object handle (block 3114). Specifically, the first child client object 710*b* is referenced to the first object handle 712*b* and the second child client object 710*c* is referenced to the second object handle 712*c*. The first UI view 702 then references the first and second child client objects 710*b* and 710*c* (block 3116), which forms a communication path between the first UI view 702 and the first and second real objects 708*c* and 708*d* as shown in FIG. 7.

As shown in FIG. 31B, the second UI view then requests access to the first real object 708*c* (block 3118). The client model 116 then determines if the first and second views 702 and 704 share a client schema (e.g., one of the client schema hierarchies FIGS. 14, 17, 20, 23, 26, and 29) (block 3120). If the UI views 702 and 704 do share a client schema, the first UI view 702 passes the first child client object 710*b* to the second user view 704 (block 3122). In this case, as shown in FIG. 7, a data path is established between the second UI view 704 and the first child client object 710*b* and the data path between the first UI view 702 and the first child client object 710*b* is inactivated because the first UI view 702 no longer references the first child client object 710*b*.

If the first and second UI views 702 and 704 do not share a client schema, the first UI view 702 passes to the second UI view 704 a server path corresponding to the first child client object 710*b* (block 3124). The second UI view 704 then passes the server path to the client model 116 and issues a request the client model 116 to look up an item on the server path (block 3126). The client model 116 then creates a third mask 804 (FIG. 8) and a third object handle 806 (FIG. 8) that reference the first real object 708*c* (block 3128). The second UI view 704 then receives from the client model 116 the third object handle 804 (FIG. 8) (block 3130). The second UI view 704 then instantiates the third child client object 804 (FIG. 8) (block 3132). The third child client object 804 then references the third object handle 804 (block 3134). A communication path is then formed between the second UI view 704 and the first real object 708*c* as shown in FIG. 8. When the first UI view 702 is finished accessing the first real object 708*c*, the client model indicates that the first child client object 710*b*, the first object handle 712*b*, and the first mask 714*b* are unused or inactive and ready for garbage collection (block 3136).

After the client model 116 indicates which client objects, handles, and masks are ready for garbage collection or after the first UI view 702 passes the first child client object 710*b* to the second UI view 704 at block 3122, the client model 116 determines if the first UI view 704 needs to access the first real object 708*c* again (block 3138). If the first UI view 704 does need to access the first real object 708*c* again, then control is passed back to block 3104 (FIG. 31A) and the operations described above in connection with blocks 3104 through 3116 are repeated to establish a communication path between the first UI view 702 and the first real object 708*c*. In this case, as shown in FIG. 7, a communication path from the first UI view 702 to the first real object 708*c* is established via a second instance of the first client child object 'O1" 710*e*, a second instance if the first object handle 'H1" 712*d*, and a second instance of the first mask 'M1" 714*d*. If the client model 116 determines at block 3138 that the first UI view 702 does not need to access the first real object 708*c* again, then the process is ended.

FIG. 32 is an example method that may be used to update modified process control data in client objects (e.g., the client object 902 of FIG. 9). Initially, the client model 116 (FIG. 1) obtains an update notification event (block 3202). The client model 116 receives the update notification event from the process control system database server 112 and/or the process control system database 110. For example, when stored process control data is modified in the process control system database 110, the process control system database 110 issues an update notification event (e.g., an 'UpdateNotification' event) and a list of questionable real objects or dirty real objects (e.g., some of the real objects 216 of FIGS. 2 and 7 associated with process control data modified in the database 110). In response to the 'UpdateNotification' event, the client model 116 identifies one or more questionable client objects (e.g., some of the client objects 212 of FIGS. 2 and 7) corresponding to the questionable real objects provided to the client model 110 via the 'UpdateNotification' event (block 3204). The client model 116 then communicates a list of questionable client objects to a client application (e.g., the client application 108 of FIG. 1) (block 3206) via, for example, a 'QuestionableUpdateNotification' event. The list of questionable client objects may include the handles or identifications of each of the questionable client objects.

The client application 108 then receives the list of questionable client objects from the client model 116 and populates a dirty hash table (e.g., the dirty hash table 916 of FIG. 9) based on the list of questionable client objects (block 3208). For example, pre-generated partial classes (e.g., the pre-generated partial classes 206 of FIG. 2) of the client application 108 may include a method or event that monitors for the 'QuestionableUpdateNotification' event and the list of questionable client objects. The client application 108 then notifies any visible UI views (e.g., the UI views 702 and 704 of FIG. 7 or the UI view 118 of FIG. 9) that an update notification event has been received (block 3210). For example, to decrease the amount of time required to update process control data that is visible to a user, the client application 108 may not notify any UI views that are minimized on a user interface display. The visible UI views then determine if any of their client objects are dirty based on the dirty hash table 916 (block 3212). For example, the client objects of the visible UI views determine if any of their handles or identifications correspond to the handles or identifications of the questionable client objects in the dirty hash table 916.

The visible UI views then flag any used object handles that are in the dirty hash table 916 (block 3214). For example, if the UI view 118 is still using the client object 902 and an object handle corresponding to the client object 902 is in the dirty hash table 916, the object 902 flags its corresponding object handle in the dirty hash table 916 to indicate that the client object 902 is still 'in use' and is, thus, not ready for garbage collection. Any object handles in the dirty hash table 916 that are not flagged are designated or specified as inactive or unused and available for garbage collection. The client model 116 then removes or unloads all inactive or unused dirty object handles (block 3216). For example, the client model 116 may use a garbage collection routine to remove or unload all dirty object handles that are listed in the dirty hash table 916, but that are not flagged as being used or active.

The client model 116 then retrieves updated or modified process control data for the dirty object handles that are flagged as used in the dirty hash table 916 (block 3218). For example, the client model 116 generates a query corresponding to the process control data of the 'in use' dirty objects and communicates the query to the process control system database server 112 (FIG. 1). The process control system database server 112 then retrieves the modified process control data from the process control system database 110 and returns the modified process control data to the client model 116.

The client model 116 then converts the updated or modified process control data from a server schema to a client schema (block 3220). For example, the client model 116 may use any of the mapping configurations described above in connection with FIGS. 14, 17, 20, 23, 26, and 29 to convert or map the modified process control data from the server schema (e.g., one of the server schemas hierarchies of FIGS. 14, 17, 20, 23, 26, and 29) to the client schemas (e.g., one of the client schema hierarchies of FIGS. 14, 17, 20, 23, 26, and 29).

The client model 116 then determines which process control data values that are currently loaded for the questionable client objects are different from the received modified process control data and communicates only the modified process control data that is different (e.g., data that has actually changed) to the client application (block 3222). In this manner, the client model 116 does not have to communicate to the client application 108 any process control data that is indicated as modified but that in actuality has not changed from the process control data currently loaded in the client application 108. The client application 108 then issues an update notification to client objects associated with used dirty object handles and for which modified process control data was received from the client model 116 (block 3224). For example, the client application 108 may issue an update notification to the client object 902 (FIG. 9) and pass modified process control data associated with any of the PROPERTY_C element 910*c*, the PROPERTY_D element 910*d*, and the PROPERTY_E element 910*e* (FIG. 9). Each client object then updates its data (block 3226) based on the received modified process control data. For example, the client object 902 may update the values of the elements 910*c*, 910*d*, and 910*e* based on the received modified process control data.

Figure 33:
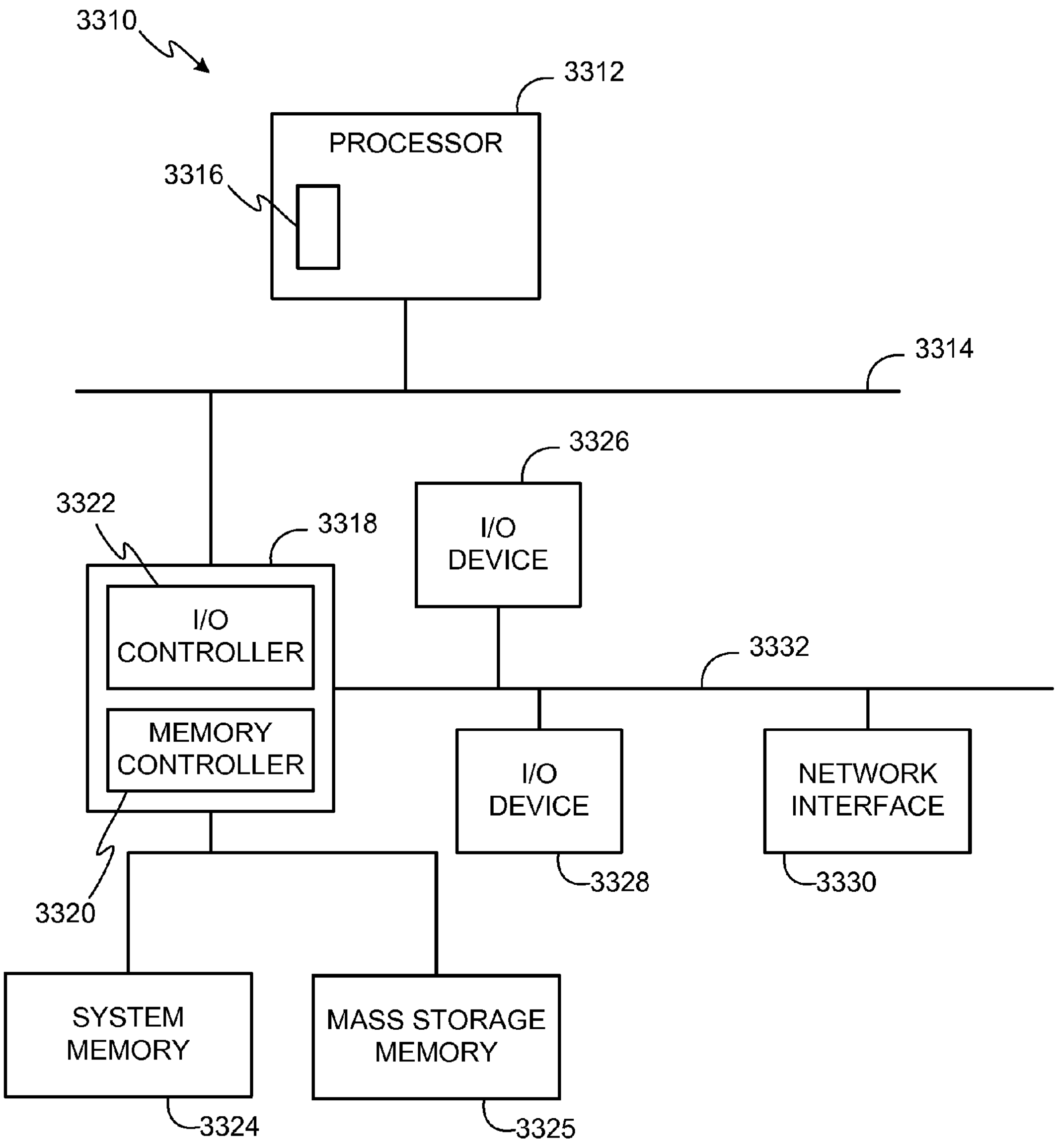
FIG. 33 is a block diagram of an example processor system that may be used to implement the example apparatus, methods, and articles of manufacture described herein.

FIG. 33 is a block diagram of an example processor system that may be used to implement the example apparatus, methods, and articles of manufacture described herein. As shown in FIG. 33, the processor system 3310 includes a processor 3312 that is coupled to an interconnection bus 3314. The processor 3312 includes a register set or register space 3316, which is depicted in FIG. 33 as being entirely on-chip, but which could alternatively be located entirely or partially off-chip and directly coupled to the processor 3312 via dedicated electrical connections and/or via the interconnection bus 3314. The processor 3312 may be any suitable processor, processing unit or microprocessor. Although not shown in FIG. 33, the system 3310 may be a multi-processor system and, thus, may include one or more additional processors that are identical or similar to the processor 3312 and that are communicatively coupled to the interconnection bus 3314.

The processor 3312 of FIG. 33 is coupled to a chipset 3318, which includes a memory controller 3320 and an input/output (I/O) controller 3322. As is well known, a chipset typically provides I/O and memory management functions as well as a plurality of general purpose and/or special purpose registers, timers, etc. that are accessible or used by one or more processors coupled to the chipset 3318. The memory controller 3320 performs functions that enable the processor 3312 (or processors if there are multiple processors) to access a system memory 3324 and a mass storage memory 3325.

The system memory 3324 may include any desired type of volatile and/or non-volatile memory such as, for example, static random access memory (SRAM), dynamic random access memory (DRAM), flash memory, read-only memory (ROM), etc. The mass storage memory 3325 may include any desired type of mass storage device including hard disk drives, optical drives, tape storage devices, etc.

The I/O controller 3322 performs functions that enable the processor 3312 to communicate with peripheral input/output (I/O) devices 3326 and 3328 and a network interface 3330 via an I/O bus 3332. The I/O devices 3326 and 3328 may be any desired type of I/O device such as, for example, a keyboard, a video display or monitor, a mouse, etc. The network interface 3330 may be, for example, an Ethernet device, an asynchronous transfer mode (ATM) device, an 802.11 device, a DSL modem, a cable modem, a cellular modem, etc. that enables the processor system 3310 to communicate with another processor system.

While the memory controller 3320 and the I/O controller 3322 are depicted in FIG. 33 as separate functional blocks within the chipset 3318, the functions performed by these blocks may be integrated within a single semiconductor circuit or may be implemented using two or more separate integrated circuits.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method for accessing process control data, comprising:

loading, at a client application, a user interface comprising at least one user-generated partial class associated with a user-defined data access function and at least one pre-generated partial class associated with a client schema of the user interface;

communicating a data access request based on the user-defined data access function from the user interface to a client model in the client application;

in response to the data access request from the user interface, loading a real object and instantiating a client object and a communication path between the client object and the real object in accordance with the client model, the communication path comprising an object handle, a mask, and a mapping between an element of the at least one user-generated partial class and another element of the pre-generated partial class, wherein the client object is based on the at least one user-generated partial class and the at least one pre-generated partial class, and the real object is based on a server schema of a process control server, wherein the client object references the object handle to access the real object via the mask and wherein the mask includes a pointer from the client schema to the server schema;

communicating a query from the real object to the process control server based on the data access request;

obtaining process control data from the process control server in response to the query, wherein the process control data is at least one of stored process control data or real-time process control data;

mapping, via the client model, the process control data from a first data layout associated with the server schema to a second data layout associated with the client schema, wherein the second data layout corresponds to a human-readable application view; and communicating the mapped process control data to the user.

2. A method as defined in claim 1, wherein the process control data is obtained from the process control server in extensible markup language.

3. A method as defined in claim 1, wherein the client object is loaded via the client application.

4. A method as defined in claim 1, wherein mapping the process control data from the first data layout to the second data layout comprises mapping a plurality of client role elements associated with the client schema to a server role element associated with the server schema.

5. A method as defined in claim 1, wherein mapping the process control data from the first data layout to the second data layout comprises mapping a client object associated with the client schema to a plurality of server objects associated with the server schema.

6. A method as defined in claim 1, wherein mapping the process control data from the first data layout to the second data layout comprises mapping a client role element associated with the client schema to a plurality of server role elements associated with the server schema.

7. A method as defined in claim 1, wherein mapping the process control data from the first data layout to the second data layout comprises inserting a client role element and a client object into the client schema, wherein the server schema does not include a server role element and a server object corresponding to the client role element and the client object.

8. A method as defined in claim 1, wherein mapping the process control data from the first data layout to the second data layout comprises implementing a client role element as a command.

9. A method as defined in claim 1, wherein the data access request comprises at least one of:

a request to perform a mathematical operation at the server based on data collected at the server and communicate a result to the process control application; or a request to perform a real-time measurement via a device in a process control system and communicate a real-time measurement value to the process control application.

10. An apparatus for accessing process control data, comprising:

a processor system; and a memory communicatively coupled to the processor system, the memory including stored instructions that enable the processor system to:

load, at a client application, a user interface comprising at least one user-generated partial class associated with a user-defined data access function and at least one pre-generated partial class associated with a client schema of the user interface;

communicate a data access request based on the user-defined data access function from the user interface to a client model in the client application;

in response to the data access request from the user interface, load a real object and instantiate a client object and a communication path between the client object and the real object in accordance with the client model, the communication path comprising an object handle, a mask, and a mapping between an element of the at least one user-generated partial class and another element of the pre-generated partial class, wherein the client object is based on the at least one user-generated partial class and the at least one pre-generated partial class, and the real object is based on a server schema of a process control server, wherein the client object references the object handle to access the real object via the mask and wherein the mask includes a pointer from the client schema to the server schema;

communicate a query from the real object to the process control server based on the data access request;

obtain process control data from the process control server in response to the query, wherein the process control data is at least one of stored process control data or real-time process control data;

map, via the client model, the process control data from a first data layout associated with the server schema to a second data layout associated with the client schema, wherein the second data layout corresponds to a human-readable application view; and communicate the mapped process control data to the user interface.

11. An apparatus as defined in claim 10, wherein the process control data is obtained from the process control server in extensible markup language.

12. An apparatus as defined in claim 10, wherein the client object is loaded via the client application.

13. An apparatus as defined in claim 10, wherein the instructions enable the processor system to map the process control data from the first data layout to the second data layout by mapping a plurality of client role elements associated with the client schema to a server role element associated with the server schema.

14. An apparatus as defined in claim 10, wherein the instructions enable the processor system to map the process control data from the first data layout to the second data layout by mapping a client object associated with the client schema to a plurality of server objects associated with the server schema.

15. An apparatus as defined in claim 10, wherein the instructions enable the processor system to map the process control data from the first data layout to the second data layout by mapping a client role element associated with the client schema to a plurality of server role elements associated with the server schema.

16. An apparatus as defined in claim 10, wherein the instructions enable the process system to map the process control data from the first data layout to the second data layout by inserting a client role element and a client object into the client schema, wherein the server schema does not include a server role element and a server object corresponding to the client role element and the client object.

17. An apparatus as defined in claim 10, wherein the instructions enable the processor system to map the process control data from the first data layout to the second data layout by implementing a client role element as a command.

18. An apparatus as defined in claim 10, wherein the instructions enable the processor system to unload the client object after communicating the mapped process control data to the process control application.

19. An apparatus as defined in claim 18, wherein the instructions enable the processor system to unload the client object by specifying that the client object is unused.

20. A tangible machine accessible medium having instructions stored thereon that, when executed, cause a machine to:

load, at a client application, a user interface comprising at least one user-generated partial class associated with a user-defined data access function and at least one pre-generated partial class associated with a client schema of the user interface;

communicate a data access request based on the user-defined data access function from the user interface to a client model in the client application;

in response to the data access request from the user interface, load a real object and instantiate a client object and a communication path between the client object and the real object in accordance with the client model, the communication path comprising an object handle, a mask, and a mapping between an element of the at least one user-generated partial class and another element of the pre-generated partial class, wherein the client object is based on the at least one user-generated partial class and the at least one pre-generated partial class, and the real object is based on a server schema of a process control server, wherein the client object references the object handle to access the real object via the mask and wherein the mask includes a pointer from the client schema to the server schema;

communicate a query from the real object to the process control server based on the data access request;

obtain process control data from the process control server in response to the query, wherein the process control data is at least one of stored process control data or real-time process control data;

map, via the client model, the process control data from a first data layout associated with the server schema to a second data layout associated with the client schema, wherein the second data layout corresponds to a human-readable application view; and communicate the mapped process control data to the user interface.

21. A tangible machine accessible medium as defined in claim 20, wherein the process control data is obtained from the process control server in extensible markup language.

22. A tangible machine accessible medium as defined in claim 20, wherein the client object is loaded via the client application.

* * * * *